United States Patent [19]

Udo et al.

[11] Patent Number: 5,561,332
[45] Date of Patent: Oct. 1, 1996

[54] VEHICLE ANTI-THEFT DEVICE HAVING BACK-UP MEANS SHOULD THE ECU FAIL, BUT PREVENTING THEFT IF THE ECU WAS INTENTIONALLY DAMAGED

[75] Inventors: Hiroshi Udo; Sadao Kobayashi, both of Chigasaki; Hiroshi Funakoshi, Zama, all of Japan

[73] Assignee: Nissan Motor Co., Ltd., Kanagawa, Japan

[21] Appl. No.: 487,328

[22] Filed: Jun. 7, 1995

[30] Foreign Application Priority Data

Jun. 10, 1994 [JP] Japan ................................ 6-129098
Jun. 16, 1994 [JP] Japan ................................ 6-134431

[51] Int. Cl.$^6$ ........................................ B60R 25/04
[52] U.S. Cl. ................ 307/10.5; 123/198 DB; 123/198 DC; 180/287; 364/424.01
[58] Field of Search ................. 307/9.1–10.6; 180/287; 123/198 DB, 198 DC, 198 B; 340/426, 441, 825.32, 825.34, 825.69, 825.72; 364/424.01, 424.05

[56] References Cited

U.S. PATENT DOCUMENTS 4,749,873  6/1988  Mutoh et al. ...................... 307/10.2
5,091,856  2/1992  Hasegawa et al. ................ 364/424.05
5,394,327  2/1995  Simon, Jr. et al. ................ 364/424.01

FOREIGN PATENT DOCUMENTS 55-151133  11/1980  Japan.

*Primary Examiner*—William M. Shoop, Jr.
*Assistant Examiner*—Richard T. Elms
*Attorney, Agent, or Firm*—Lowe, Price, LeBlanc & Becker

[57] ABSTRACT

This invention relates to an anti-theft device for an engine-driven vehicle having a control unit for controlling either of the supply of fuel to an engine and the ignition timing of this fuel, and a back-up mechanism acting for the control unit when the control unit is damaged. It is determined whether or not the control unit has functioned appropriately when the engine is started up, and if it is determined that it has not, the function of the back-up mechanism is prohibited. Hence, the engine will not start and theft of the vehicle is prevented even if, for example, the control unit is deliberately damaged and an attempt is made to start the engine. However, the back-up mechanism does function if the control unit develops a fault while the vehicle is running, and the vehicle therefore continues to run.

11 Claims, 30 Drawing Sheets

5,561,332

VEHICLE ANTI-THEFT DEVICE HAVING BACK-UP MEANS SHOULD THE ECU FAIL, BUT PREVENTING THEFT IF THE ECU WAS INTENTIONALLY DAMAGED

FIELD OF THE INVENTION

This invention relates to preventing the theft of an automobile having an engine electronic control device and a back-up mechanism.

BACKGROUND OF THE INVENTION

An electronic intensive engine control of vehicle by using a microprocessor is described for example in Tokkai Sho 55-151133 published by the Japanese Patent Office in 1980.

When the ignition switch is turned to the START position, a starter cranks the crankshaft. Simultaneously, an electronic control unit (ECU) computes a starting infection pulse width, and a signal representative of this pulse width is sent to the fuel injector. The fuel injector injects an amount of fuel corresponding to this signal into an intake pipe, and the engine starts.

After start-up, the ECU computes a suitable fuel infection pulse width according to the change of engine running conditions, and controls the fuel supply to the engine. This permits fine control of the fuel supply, and the unit also controlling the ignition timing depending on the running conditions.

However, if the ECU breaks down while the vehicle is running, fuel injection and ignition are no longer possible, and the vehicle stops wherever it happens to be. It is therefore expedient to provide a backup mechanism that, independently of the ECU, can inject a constant amount of fuel and ignite it at a constant crankshaft rotation position, so that the vehicle can at least reach a repair station. Such a backup mechanism may for example be provided by a hybrid IC and gate array.

If such a backup mechanism is provided, the backup mechanism operates so that the vehicle still runs even if the ECU is damaged, or the signal line from the ECU to the hybrid IC is cut. Hence, even if the ECU has an anti-theft mechanism so that the vehicle will not start even if, for example, the contact of the ignition switch is connected, the engine can still be made to start by breaking the ECU. In other words, the back-up mechanism may render the anti-theft mechanism useless.

SUMMARY OF THE INVENTION

It is therefore an object of the invention to provide an anti-theft device that can prevent a vehicle from starting even if the ECU is broken.

It is a further object of this invention to provide an anti-theft device that does not interfere with back-up action when the ECU is damaged during running of the vehicle.

In order to achieve the above objects, this invention provides an anti-theft device for an engine-driven vehicle comprising a control unit for controlling at least either of a supply of fuel to the engine and an ignition timing of the fuel, a back-up mechanism acting for the control unit when the control unit is damaged, a mechanism for determining whether or not the control unit has functioned appropriately when the engine is started up, and a mechanism for prohibiting the function of the back-up mechanism when the control unit has not functioned appropriately when the engine is started up.

According to an aspect of this invention, the anti-theft device comprises a control unit for controlling at least either of a supply of fuel to the engine and an ignition timing of the fuel, a back-up mechanism acting for the control unit when the control unit is damaged, a first mechanism for storing an identifying code provided inside the control unit, a second mechanism provided outside the control unit for storing an identifying code, a mechanism for verifying whether or not the identifying codes stored in the first and second storing mechanisms are identical when the engine is started up, a mechanism for preventing engine start-up when the identifying codes are not identical, a mechanism for retaining a verification result of whether or not the identifying codes are identical, and mechanism for prohibiting a function of the back-up mechanism when the verification result shows the identifying codes are not identical.

The retaining mechanism preferably comprises a mechanism for coding the verification result, a mechanism for decoding the code, and a mechanism for retaining the decoded result.

The code decoding mechanism, the decoded result retaining mechanism and the prohibiting mechanism are preferably formed in a one-piece construction with the back-up mechanism.

The retaining mechanism preferably retains a verification result also after the engine stops.

According to another aspect of this invention, the anti-theft device comprises a starter mechanism for starting the engine, A control unit for controlling at least either of a supply of fuel to the engine and an ignition timing of the fuel, a back-up mechanism acting for the control unit when the control unit is damaged, a mechanism for detecting a rotation of the engine, a mechanism for detecting whether or not the starter mechanism is operating, a mechanism for prohibiting a function of the back-up mechanism when the rotation is not detected, and a mechanism for prohibiting the function of the backup mechanism while the starter mechanism is operating.

According to yet another aspect of this invention, the anti-theft device comprises a starter mechanism for starting the engine, a control unit for controlling at least either of a supply of fuel to the engine and an ignition timing of the fuel by outputting a control signal, a mechanism for outputting a rotation signal corresponding to a predetermined rotation angle of the engine, and a back-up mechanism for outputting the control signal based on the rotation signal when the control unit is damaged, a first mechanism for storing an identifying code provided inside the control unit, a second mechanism provided outside the control unit for storing an identifying code, a mechanism for verifying whether or not the identifying codes stored in the first and second storing mechanism are identical when the engine is started up, a mechanism for preventing engine start-up when the identifying codes are not identical, a mechanism for detecting whether or not the starter mechanism is operating, a mechanism for prohibiting a function of the back-up mechanism when the rotation signal is not detected, and a mechanism for prohibiting the function of the back-up mechanism while the starter mechanism is operating.

According to yet another aspect of this invention, the anti-theft device comprises a starter mechanism for starting the engine, a mechanism for supplying fuel to the engine according to an input injection signal, a mechanism for igniting the fuel inside the engine according to an input ignition signal, a control unit for controlling at least either of the fuel supplying and igniting mechanisms by outputting a control signal, a mechanism for outputting a rotation signal corresponding to a predetermined rotation angle of the engine, a back-up mechanism for outputting the control signal based on the rotation signal when the control unit is damaged, a first mechanism for storing an identifying code provided inside the control unit, a second mechanism provided outside the control unit for storing an identifying code, a mechanism for verifying whether or not the identifying codes stored in the first and second storing mechanism are identical when the engine is started up, a mechanism for preventing engine start-up when the identifying codes are not identical, a mechanism for detecting whether or not the starter mechanism is operating, a mechanism for prohibiting a function of the back-up mechanism when the rotation signal is not detected, and a mechanism for prohibiting the function of the back-up mechanism while the starter mechanism is operating.

Preferably, the starter mechanism operation detecting mechanism comprises a starter switch for continuously outputting an ON signal while the starter mechanism is operating, the aforesaid two prohibiting mechanisms comprise a NOT circuit for inverting the output signal from the starter switch and an AND circuit for outputting a signal corresponding to an overlapping part of the inverted signal and the rotation signal, and the back-up mechanism functions according to the output signal from the AND circuit.

Alternatively, the starter mechanism operation detecting mechanism comprises a starter switch for continuously outputting an ON signal while the starter mechanism is operating, the two aforesaid prohibiting mechanisms comprise a NOT circuit for inverting the output signal from the starter switch, and an AND circuit for outputting a signal corresponding to an overlapping part of the signal output by the back-up mechanism and the signal output by the NOT circuit as the control signal.

According to yet another aspect of this invention, the anti-theft device comprises a starter mechanism for starting the engine, a control unit for controlling at least either a supply of fuel to the engine and an ignition timing of the fuel by outputting a control signal, an ignition switch for activating the control unit when the switch is changed over from OFF to ON, a mechanism for outputting a rotation signal corresponding to a predetermined rotation angle of the engine, a back-up mechanism for outputting the control signal based on the rotation signal when the control unit is damaged, a mechanism for detecting whether or not the ignition switch has been changed over from OFF to ON, a mechanism for prohibiting engine start-up when the ignition switch has been changed over from OFF to ON, a first mechanism for storing an identifying code provided inside the control unit, a second mechanism provided outside the control unit for storing an identifying code, a mechanism for verifying whether or not the identifying codes stored in the first and second storing mechanism are identical when the ignition switch is changed over from OFF to ON, a mechanism for releasing prohibition of engine start-up by the prohibiting mechanism when the identifying codes are identical, a mechanism for detecting whether or not the starter mechanism is operating, a mechanisms for prohibiting a function of the back-up mechanism when the rotation signal is not detected, and a mechanisms for prohibiting the function of the back-up mechanism while the starter mechanism is operating.

The details as well as other features and advantages of this invention are set forth in the remainder of the specification and are shown in the accompanying drawings.

DESCRIPTION OF THE PREFERRED EMBODIMENTS

Figure 1:
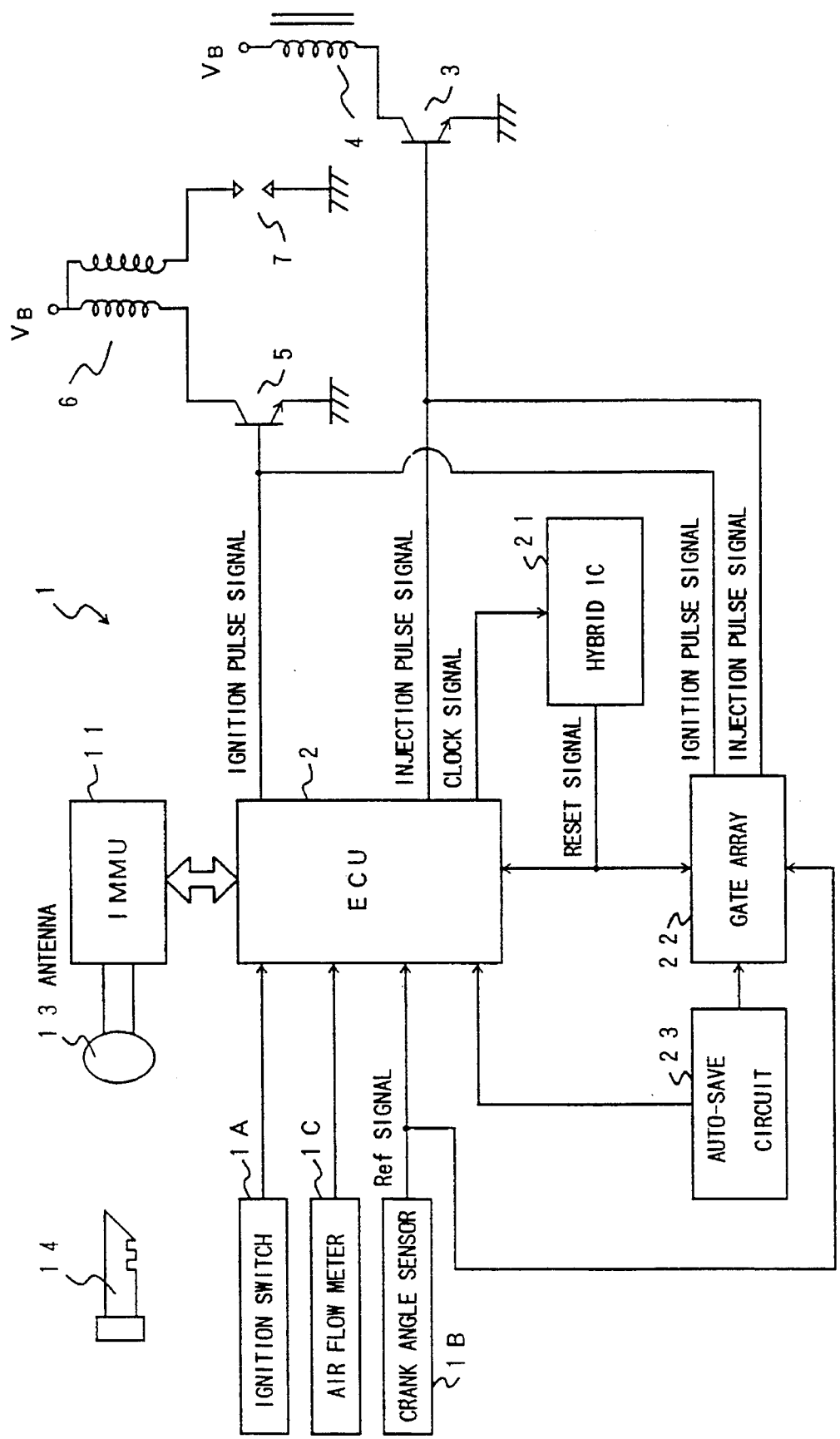
FIG. 1 is a schematic diagram of an anti-theft device according to a first embodiment of this invention.

Referring to FIG. 1 of the drawings, an electronic intensive engine control system 1 is provided with an ignition switch 1A, various sensors such as a crank angle sensor 1B for detecting a predetermined rotation angle of an engine and an air flow meter 1C for detecting the air volume entering the engine, an electronic control unit (referred to hereinafter as ECU) 2 into which signals from these sensors are input, an injector and ignition unit activated by output signals from the ECU 2.

The injector being installed in an intake pipe of the engine comprises a power transistor 3 and a solenoid coil 4. The ignition unit being installed in an intake port of the engine comprises a power transistor 5, ignition coil 6 and spark plug 7.

According to the internal program, the ECU 2 controls the amount of fuel injected via the injector so that the gas mixture supplied to the engine of the vehicle has a predetermined air-fuel ratio, and it also controls the ignition time of the gas mixture in the engine via the ignition unit.

When the injection signal output by ECU 2 changes from OFF to ON, current flows from a battery power supply to the solenoid coil 4 due to an effect of the power transistor 3 activated by the injection signal so as to open the injector fully. When the injection signal changes from ON to Off, the injector closes fully. When the injector is opening, fuel at constant pressure is injected into the intake pipe, and fuel is supplied in an amount that is directly proportional to the valve opening duration.

When the ignition signal output by the ECU 2 switches from OFF to ON, current flows from the battery power supply to the primary coil of the ignition coil 6 due to an effect of the power transistor 5 activated by the ignition signal. When the ignition signal is switched from ON to OFF, this primary current is interrupted, a high voltage is produced in the secondary coil of the ignition coil 6, and a spark jumps across the spark plug 7. Herein, the time at which the power transistor 5 is switched from ON to OFF is the ignition time. During cold engine start-up, this time is delayed so as to increase the exhaust temperature and promote engine warm-up.

The control unit 1 further comprises an immobilizing control unit (referred to hereinafter as IMMU) 11. ECU 2 and IMMU 11 are connected by a two-way communications line. These units may for example be stand-alone microprocessors, the whole unit being replaced in the case of a fault, but they may also be built from ordinary electrical parts.

IMMU 11 is able to communicate with a transponder key 14 that can emit an electronic code. IMMU 11 receives the electronic code issued by the transponder key 14 via an antenna 13 determines whether or not this code is identical to the code stored in IMMU 11, and if it is not, communication between IMMU and ECU 2 is not established.

If therefore IMMU 11 is removed and replaced by an IMMU from another vehicle, or if a transponder key from another vehicle is matched with this IMMU 11, a communications link between the IMMU and ECU 2 will not be established. In other words, in order to set up a communications link between IMMU 11 and ECU 2, it is essential to have the correct combination of transponder key and IMMU.

Operations to be performed between ECU 2 and IMMU 11 are divided into two cases, viz.: (1) when the ignition switch is switched from the OFF to the ON position, and (2) when the ignition switch is switched from the ON to the OFF position.

(1) When Switching from the OFF to the ON Position (On Engine Start-up)

(i) ECU 2 first allows a start-up of or fuel supply to the engine, but then it verifies whether or not communications conditions with IMMU 11 are satisfied. To satisfy communications conditions, the electronic codes of IMMU 11 and the transponder key 14 must be identical.

(ii) When the communications conditions are satisfied, ECU 2 compares the identifying code sent from IMMU 11 and the identifying code stored in EEPROM of ECU 2. The identifying code is generated and stored each time the engine stops. EEPROM is an abbreviation for a ROM in which data can be electrically erased and entered, and in which data can be written upon a command from the CPU without need of a power supply. Instead of EEPROM, a flash memory that can be erased without a power supply or a memory having a special power supply may be used. This identifying code is updated on each vehicle running occasion as described hereinafter.

(iii) Continuation of start-up or fuel supply is allowed only when the identifying codes are identical, and when they are not, start-up or fuel supply is prohibited.

(2) When Switching from the OFF to the ON Position (On Stopping the Engine)

(i) ECU 2 randomly determines the next code, and sends it to IMMU 11.

(ii) IMMU 11 stores this next code in EEPROM, and returns it to ECU 2.

(iii) ECU 2 compares the next code returned by IMMU 11 with the next code it sent out, and verifies that they are the same. Hence the identifying code is different on each engine start-up.

However, if ECU 2 or IMMU 11 is damaged, the codes will not be the same and the ignition cannot be started even if the damaged control unit is replaced.

In order to permit replacement of only one damaged control unit, an initializing procedure is allowed which synchronizes the identifying codes of the replacement unit (provided this is a new unit) and the control unit which is not damaged. This initializing procedure is performed by connecting a third control unit, not shown, to ECU 2.

First, a flag indicating whether or not the control unit is a new unit is written in EEPROM of ECU 2 and IMMU 11. This flag is set to "new" when the control units are shipped.

The program software of ECU 2 and IMMU 11 has no function to reset the new unit flag to "new". This is because initialization of identifying codes should not be performed unless the unit is new, and if the program software of the unit could reset this flag, it would no longer be possible to determine whether or not the unit was a real new unit.

Insofar as regards control unit replacement, two cases may also be distinguished for the process executed between ECU 2 and IMMU 11, viz.: (3) when the ignition switch is switched from OFF to ON, and (4) when the ignition switch is returned to the OFF position.

(3) When the Ignition Switch is Switched from OFF to ON (i) When ECU 2 has allowed start-up or fuel supply, it is verified whether or not communications conditions with IMMU 11 are satisfied. To satisfy communications conditions, the electronic codes of IMMU 11 and the transponder key 14 must be identical.

(ii) When communications conditions are satisfied, it is determined whether or not either one of the control units is new from the new unit flag stored in EEPROM of the control units 2 and 11.

(iii) When IMMU 11 is new, an initialization request is issued by ECU 2, and the new unit flag of IMMU 11 is set to the "not new" setting.

(iv) When an initialization command is input by the third control unit, ECU 2 sends an initialization start signal of the identifying code and an initial identifying code to IMMU 11, and if the new unit flag of ECU 2 is set to "new", it is reset to "not new".

(v) After IMMU 11 stores the initial identifying code sent by ECU 2 in its EEPROM, it returns the same initial identifying code to ECU 2.

(vi) ECU 2 compares the initial identifying code sent by IMMU 11 with the initial identifying code stored in its EEPROM.

(vii) If the two codes are identical, engine start-up or fuel supply continues, and if they are not the same, engine start-up or fuel supply is prohibited. Even when a new control unit is connected and the ignition switch is returned to the START position, therefore, the engine will not start without the above initialization process.

(4) When the Ignition Switch is Returned to the OFF Position

The identifying code is updated according to the procedure of 2(i)–(iii).

Figure 2:
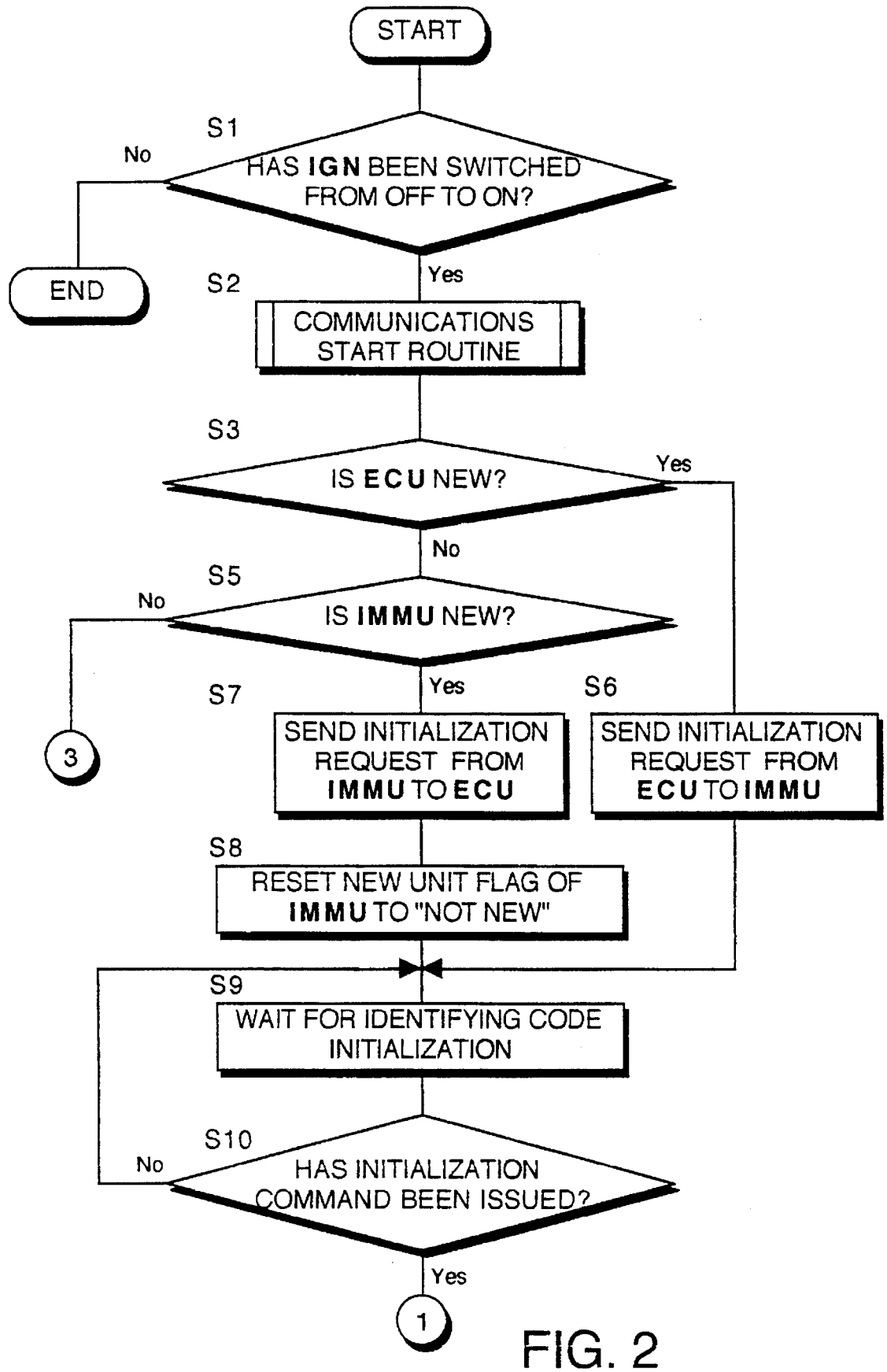
FIG. 2 is a flowchart showing a part of an anti-theft control process according to the first embodiment of this invention.
Figure 3:
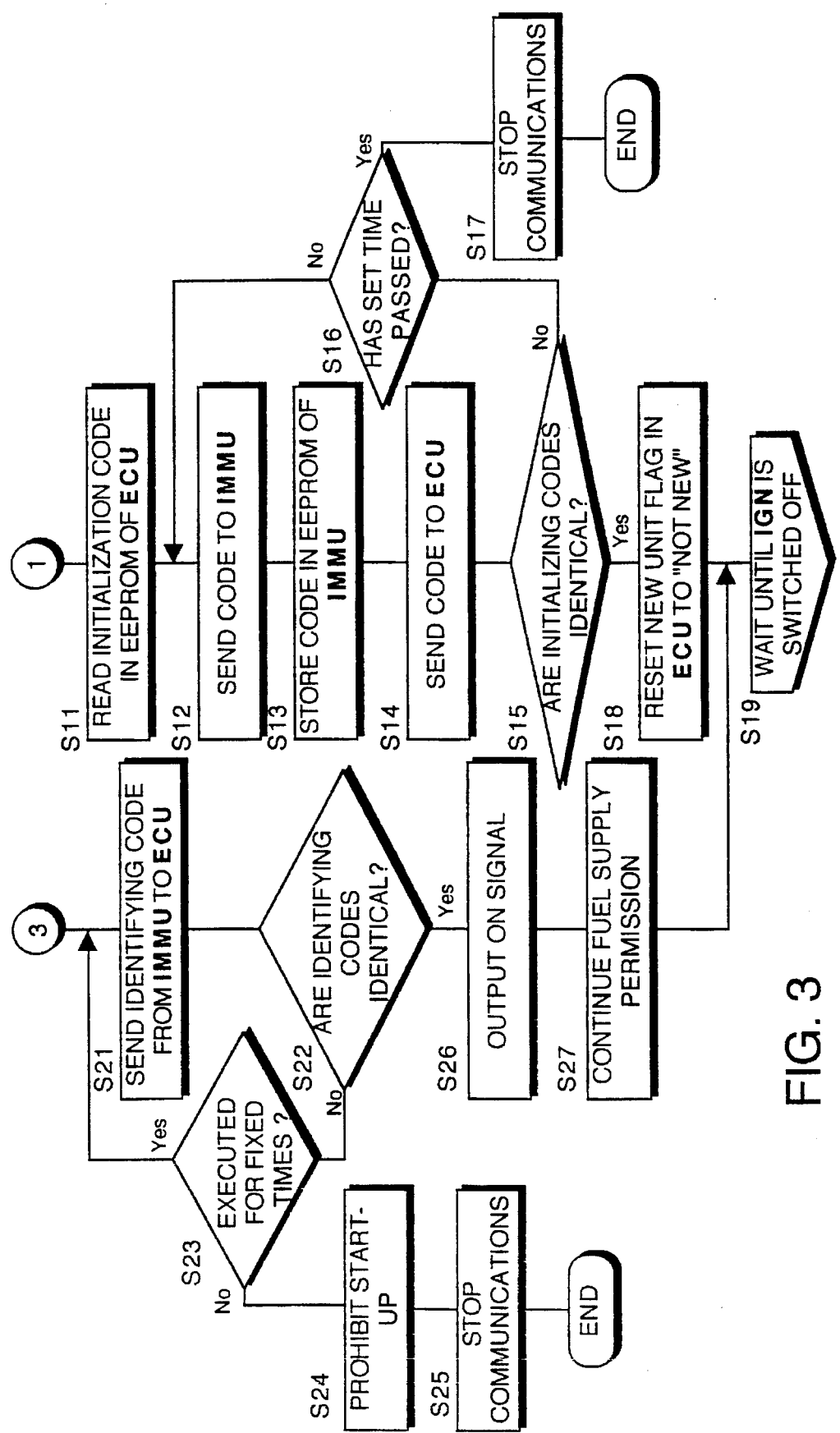
FIG. 3 is a flowchart showing a part of the anti-theft control process according to the first embodiment of this invention.
Figure 4:
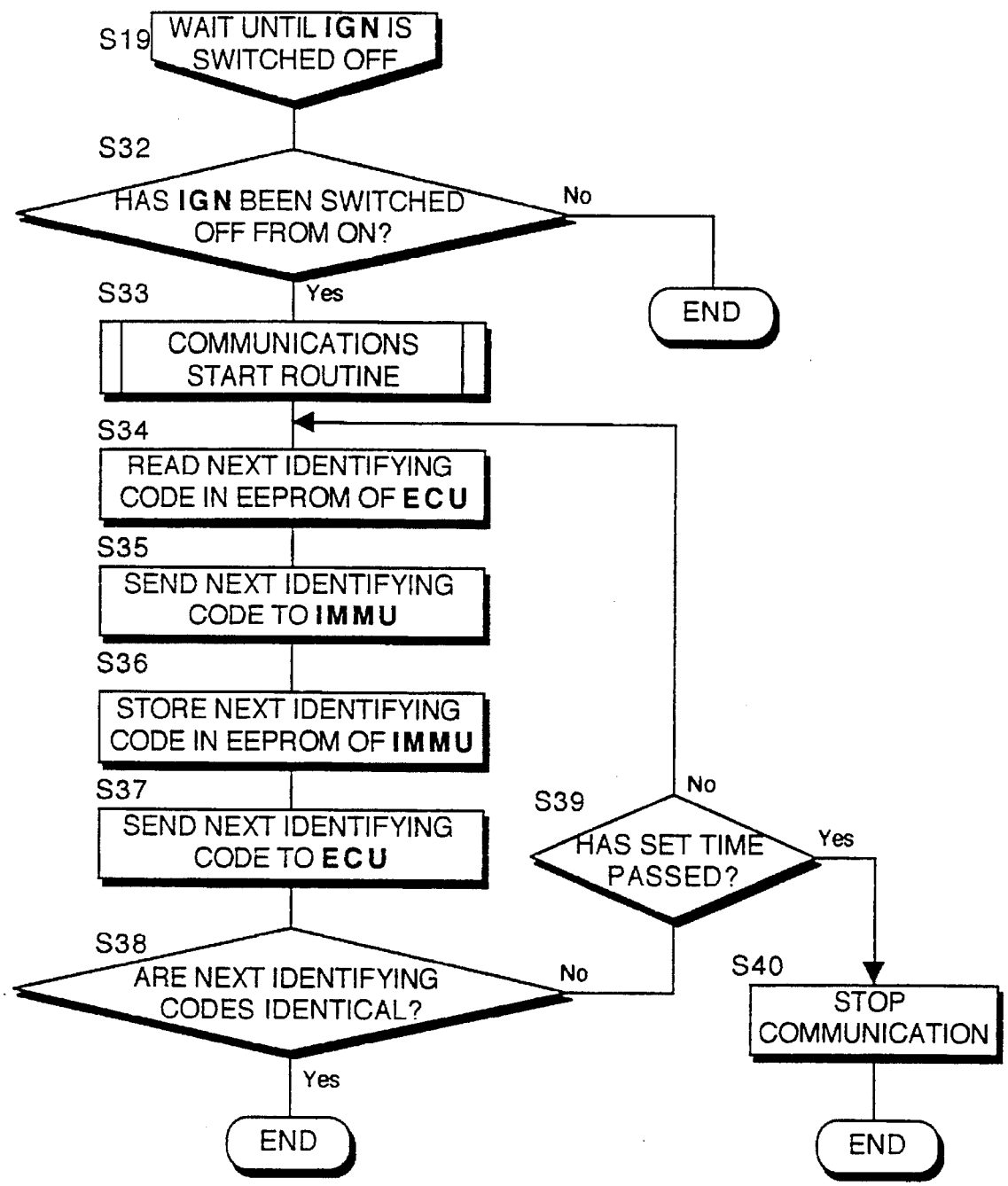
FIG. 4 is a flowchart showing a part of the anti-theft control process according to the first embodiment of this invention.

The above process is executed at fixed intervals according to the flowcharts of FIGS. 2–4.

As communication between ECU 2 and IMMU 11 is two-way, the communications mode must be set to ECU-IMMU before commands or data are sent from ECU 2 to IMMU 11. Likewise, the communications mode must be set to IMMU-ECU before commands or data are sent from IMMU 11 to ECU 2. A description of this communications mode change-over will not be given here.

Also, a description will first be given of the case where a control unit is replaced, a description of the case where not replacement is made (ordinary start-up) being given later.

In a step S1 shown in FIG. 2, it is determined whether or not the ignition switch (labelled IGN on the flowchart) has been switched from OFF to ON, and if so, a communications start routine is performed in a step S2. The details of this routine are not shown, but for example after communication start commands have been exchanged between ECU 2 and IMMU 11, the establishment of communications conditions is notified by ECU 2 to IMMU 11. IMMU 11 then compares the electronic code sent by the transponder key 14 with the code stored in IMMU 11, notifies ECU 2 if they are the same, and completes the communications start routine. If on the other hand the electronic code of the transponder key 14 and the stored code are not the same, communication is terminated, and engine start-up is prohibited. This may for example be implemented by cutting off fuel supply.

In steps S3 and S5, the task of determining whether or not ECU 2 and IMMU 11 are new is performed. For example, if the new unit flag stored in EEPROM of ECU 2 is set to "new" it is determined that ECU 2 is new, and if the new unit flag stored in EEPROM of IMMU 11 is set to "new", it is determined that IMMU 11 is new.

If it is determined in the step S3 that ECU is new, the routine proceeds to a step S6, and an initialization request signal is sent from ECU 2 to IMMU 11. On the other hand if in the steps S3, S5 it is determined that IMMU 11 is new, the routine proceeds to a step S7, an initialization request signal is sent from IMMU 11 to ECU 2, and in a step S8, the new unit flag of IMMU 11 is reset to "not new".

Hence, when at least one of the control units is new, the routine proceeds to steps S9, S10, waits until the initializing command of the identifying code is issued, and proceeds to a step S11 of FIG. 3 at that time.

The step S11 to a step S18 of FIG. 3 show the initialization of the identifying code. In the step S11, the initializing code stored in EEPROM of ECU is read, and in a step S12, this initializing code is sent from ECU to IMMU.

In a step S13, IMMU writes and stores this initializing code in its EEPROM, and in a step S14, an initializing code that is the same as the stored code is sent by IMMU to ECU.

In a step, S15, ECU compares the transmitted initializing code with the initializing code stored in its EEPROM. If the two codes are not the same, it is determined that there has been a communications error, the routine returns to the step S12, and the sending/receiving of the initializing code is repeated. This repeat sending/receiving is performed within a fixed time interval or for a fixed number of times. If the two codes do not coincide within a fixed time interval or a fixed number of times, the routine proceeds from a step S16 to a step S17 and the communication is terminated.

If the two codes do coincide within a fixed number of times, the routine proceeds to a step S18 and the new unit flag of the ECU is reset to "not new". This resetting terminates initializing of the identifying code, and in a step S19, the routine waits until the fuel switch is switched to OFF.

FIG. 4 shows the sequence of steps after the step S19.

In a step S32, when it is determined that the fuel switch has been switched from ON to OFF, in a step S33, a routine for starting communications is executed. In this routine, after communications start commands have been exchanged between ECU and IMMU, establishment of communications conditions are notified by ECU to IMMU.

The routine from a step S35 to a step S40 is the same as the routine from the step S11 to the step S17 in FIG. 3. The difference from FIG. 3 is that the code which are sent and received is not an initializing code, but the next identifying code.

If on the other hand both ECU and IMMU are not new, in other words on an ordinary start-up, the routine proceeds from the step S5 of FIG. 2 to a step S21 of FIG. 3.

In a step S21, IMMU sends the identifying code stored in its EEPROM to ECU. In a step S22, this identifying code is compared with the identifying code stored in the EEPROM of ECU. If the two codes are not the same, it is determined that there has been a communications error, the routine returns from a step S23 to the step S21, and the sending of the identifying code is repeated. This repeat sending is performed within a fixed time interval or for a fixed number of times. If the two codes do not coincide within a fixed time interval or a fixed number of times in the step S23, start-up is prohibited in a step S24, and the communication is terminated in a step S25.

If the two codes do coincide in the step S22, start-up permission or fuel supply permission is continued in a step S27, and the routine proceeds to the step S19. A step S26 which has not yet been mentioned will be described hereinafter.

Figure 5:
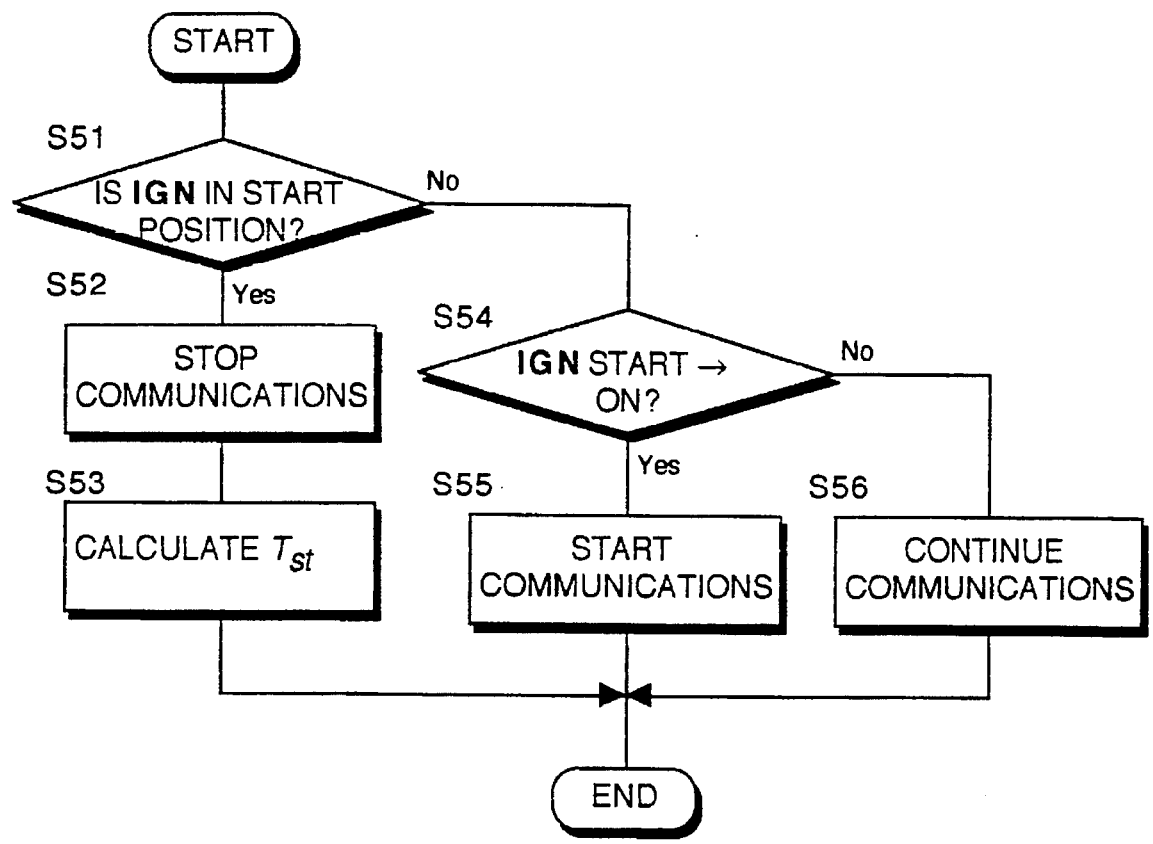
FIG 5 is a flowchart showing a communications control process at start-up according to the first embodiment of this invention.

FIG. 5 is a communications control flowchart executed by ECU 2 on start-up.

When the ignition switch is moved to the START position in a step S51, the routine proceeds to a step S52 where communications is interrupted (stopped or terminated), and in a step S53 a start-up injection pulse width Tst is computed. The start-up injection pulse width Tst may be computed by methods known in the art, such as or example the following equation:

$$Tst = Tst_0 \neq Csn \neq Kcs$$

where:
  $Tst_0$=basic value
  Csn=rotation correction factor
  Kcs=time correction factor When the ignition switch is not in the START position, but it has just been switched from START to ON in a step S54, the routine proceeds to a step S55, and communications begin (or resume). After this change-over from START to ON, the routine continues the communications in S56.

Hence, when the ignition switch is switched from OFF to ON during engine start-up, ECU receives this signal, and compares its identifying code with the identifying code sent by IMMU while start-up is still allowed. If the codes are not the same, start-up is then prohibited.

As the engine cannot be started if the identifying codes are not identical, it cannot be started even if, for example, IMMU or ECU is replaced by a control unit that was being used in another vehicle. The chances of vehicle theft occurring are therefore reduced.

When the ignition switch is returned from the ON position to OFF in order to stop the engine, the identifying codes stored in the control units ECU and IMMU are updated to the next codes with this timing. Updating of identifying codes is performed not while the engine is running, but as the last step, i.e. after the engine has stopped, so as to be as near as possible to the next engine start-up. In this way, errors in identifying codes are kept to the absolute minimum.

As a back-up means when ECU 2 has a fault, a power supply hybrid IC 21 and gate array 22 are provided in the electronic engine central processing unit 1. The gate array 22 is a type of custom LSI.

When a clock signal is no longer input form ECU 21, the power supply hybrid IC 21 determines by wired logic that ECU 2 is damaged or a fault has occurred. A reset signal is then switched ON so as to stop the function of ECU 2, and another reset signal is switched ON and output to the gate array 22.

When it receives the reset signal which is ON, the gate array 22 opens the injector in synchronism with a Ref signal from a crank angle sensor 1B instead of the ECU 2 which has stopped, and executes ignition. The injector pulse width and ignition timing at this time are both fixed values. When ECU 2 is damaged, the engine continues running although not under the best conditions so that the vehicle can be transported to a repair shop.

The back-up mechanism comprising the power supply hybrid IC 21 and gate array 22 may be replaced by a microprocessor having these functions or ASIC, i.e. a special IC. This special IC may for example be a custom LSI.

When this back-up mechanism is provided, even if ECU 2 prohibits start-up because the identifying codes on start-up are not identical, the gate array 22 will operate so that the engine can run if ECU 2 is damaged or the clock signal line to the power supply hybrid IC is deliberately cut.

To prevent this situation occurring, the vehicle anti-theft device is provided with an auto-save circuit 23 for storing the comparison result of verifying whether or not the identifying codes were identical. The auto-save circuit 23 may for example be a flip-flop circuit.

When a fault occurs in ECU 2, the back-up mechanism backs up the operation of ECU 2 only if the stored value of the auto-save circuit 23 shows that the identifying codes were identical.

Therefore, if the identifying codes were identical in the step S22, an ON signal is output, and input to the auto-save circuit 23 in the step S26. When the ON signal is input, the circuit 23 simultaneously begins outputting an ON signal, and continues outputting this ON signal until the engine stops. Hence, if the signal output by the circuit 23 is ON, it is determined that the identifying codes are identical, and if this signal is OFF, it is determined that the codes are not identical.

Figure 6:
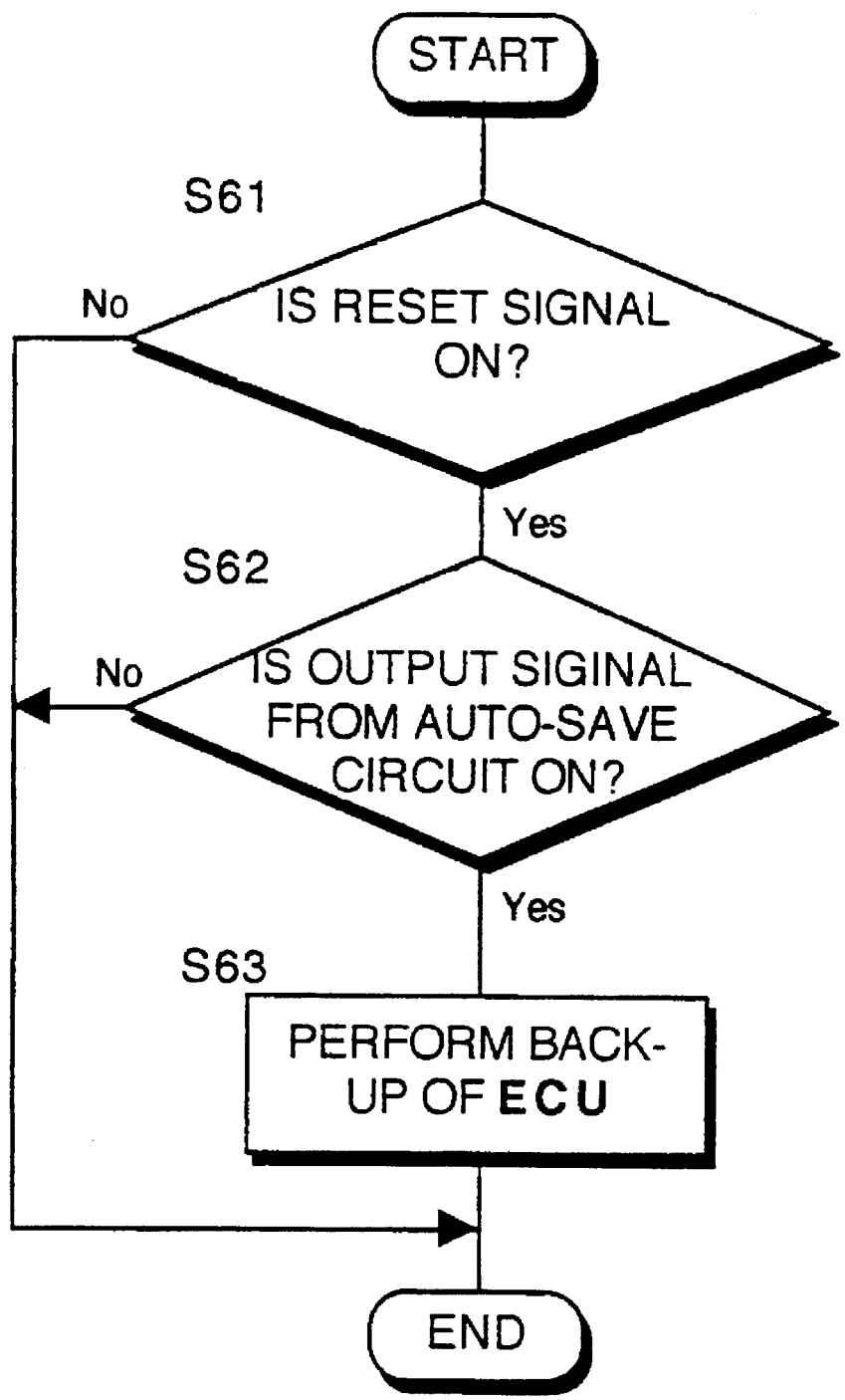
FIG. 6 is a flowchart showing a process of determining whether to allow back-up according to the first embodiment of this invention.

As shown by the flowchart of FIG. 6, the routine proceeds to a step 63 where it performs back-up of ECU 2 only when both the following conditions are satisfied:
  (1) The reset signal is ON (step 61)
  (2) The output signal from the auto-save circuit is ON (step 62)

In other words, if either of these conditions is not satisfied, the routine does not proceed to a step S63.

Hence, even if the clock signal is interrupted and the reset signal is ON, back-up is not performed when the identifying codes are not identical.

Figure 7:
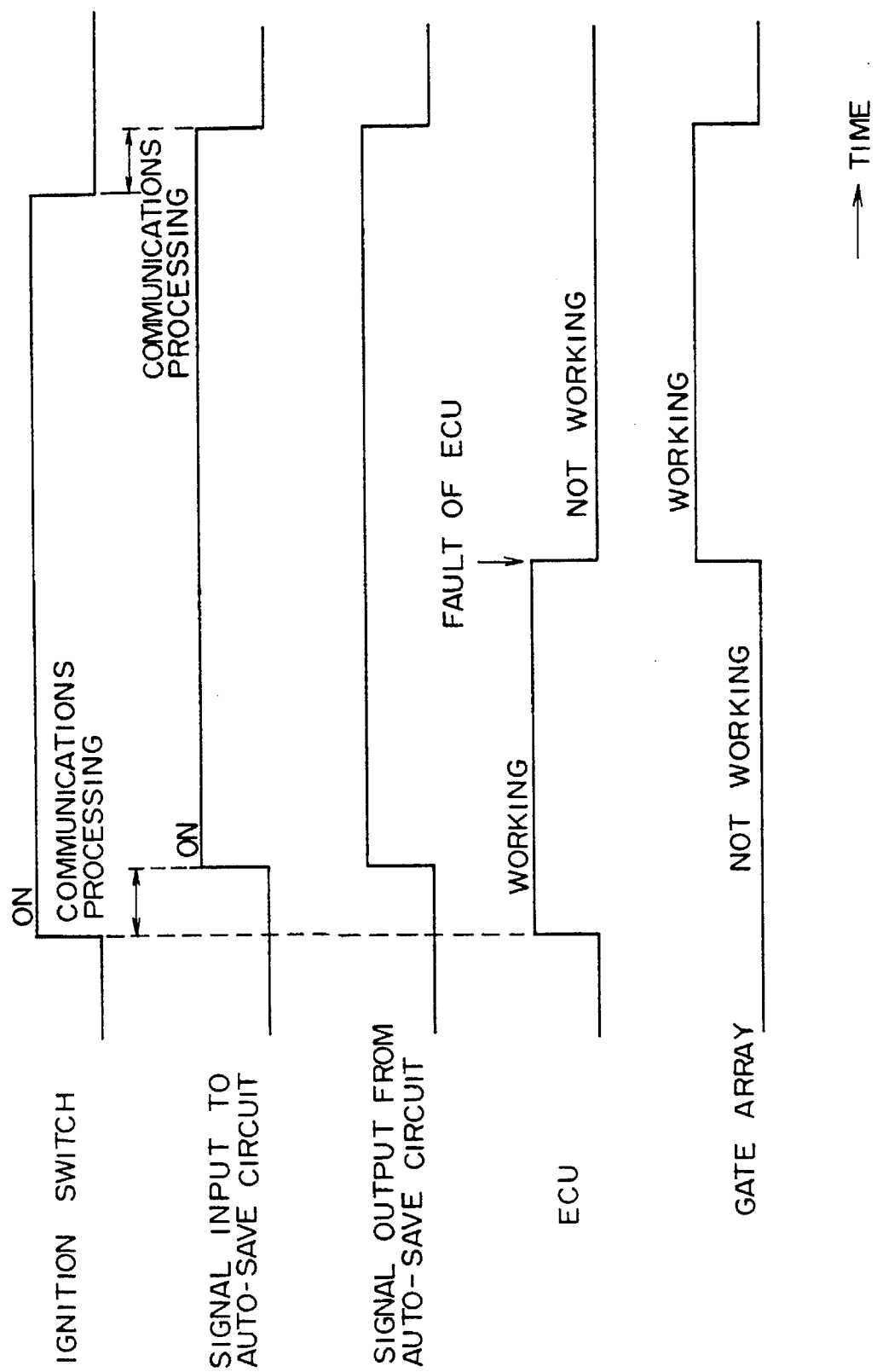
FIG. 7 is a waveform diagram of signals when an ECU is accidentally damaged, according to the first embodiment of this invention.

As shown in FIG. 7, when the identifying codes are identical after communications processing, the output signal of the circuit 23 remains ON. If a fault occurs in ECU 2 under these conditions, the power supply hybrid IC simultaneously switches the reset signal ON, and, as the output signal from the circuit 23 is ON in addition to this reset signal, the gate array 23 starts back-up of ECU 2.

Figure 8:
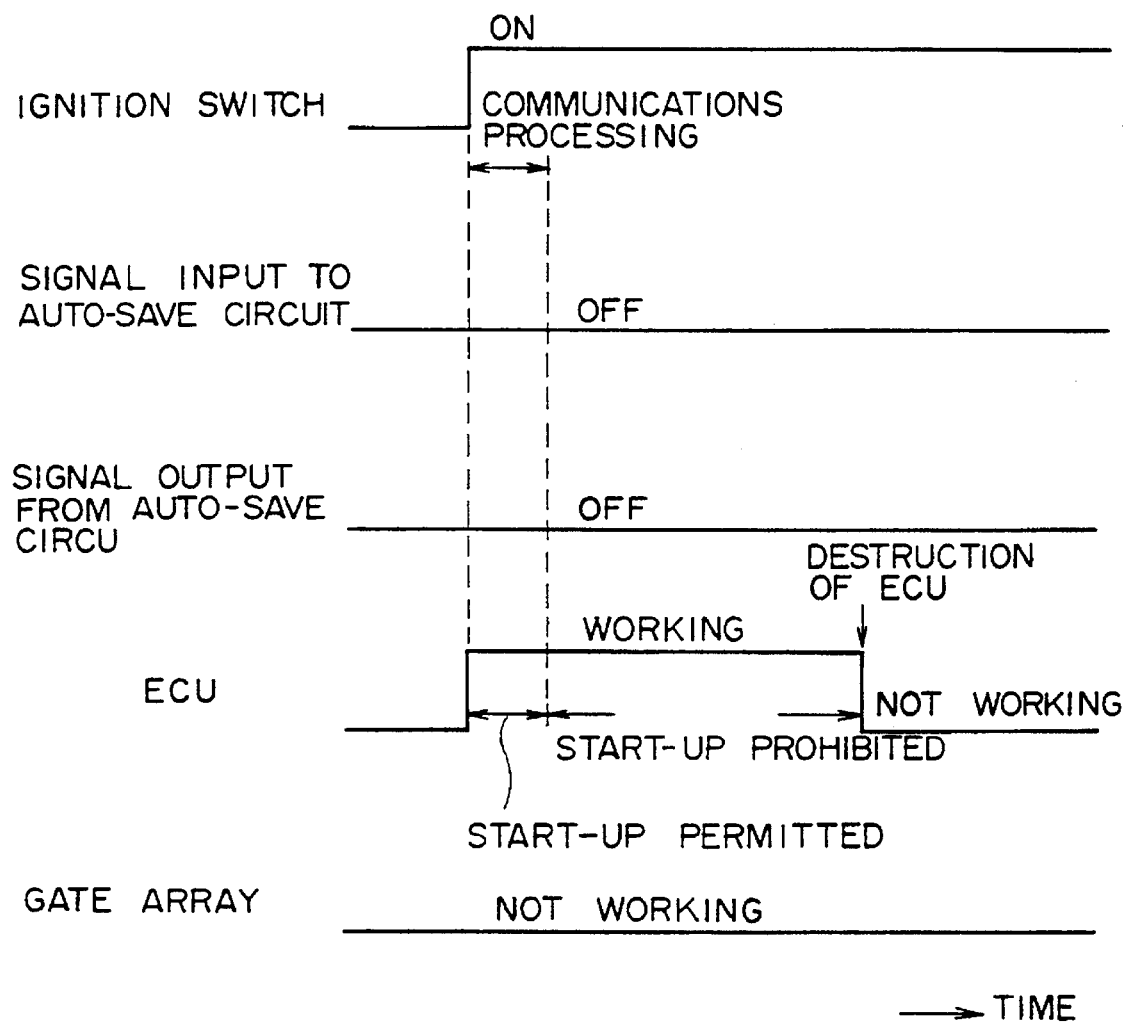
FIG. 8 is a waveform diagram of signals when the ECU is intentionally damaged, according to the first embodiment of this invention.

FIG. 8, on the other hand, shows the case where ECU 2 was broken or the signal line between ECU 2 and the hybrid IC was deliberately cut when the engine did not start even when the ignition contact was connected, due to the fact that IMMU or ECU have been replaced by a control unit from another vehicle.

In this case, as the identifying codes are not the same, start-up is prohibited after communications processing, and the output of the auto-save circuit remains OFF. Therefore, even if an ON reset signal is input to the gate array 22 because, for example, ECU 2 has been damaged, the gate array 22 does not perform back-up. If ECU 2 is damaged and backup is not performed, the engine cannot run, so the vehicle cannot be stolen.

Hence, by requiring that the reset signal from the hybrid IC is ON and that the identifying codes are identical as essential conditions for back-up to be performed, both theft prevention and back-up functions can be provided.

Figure 9:
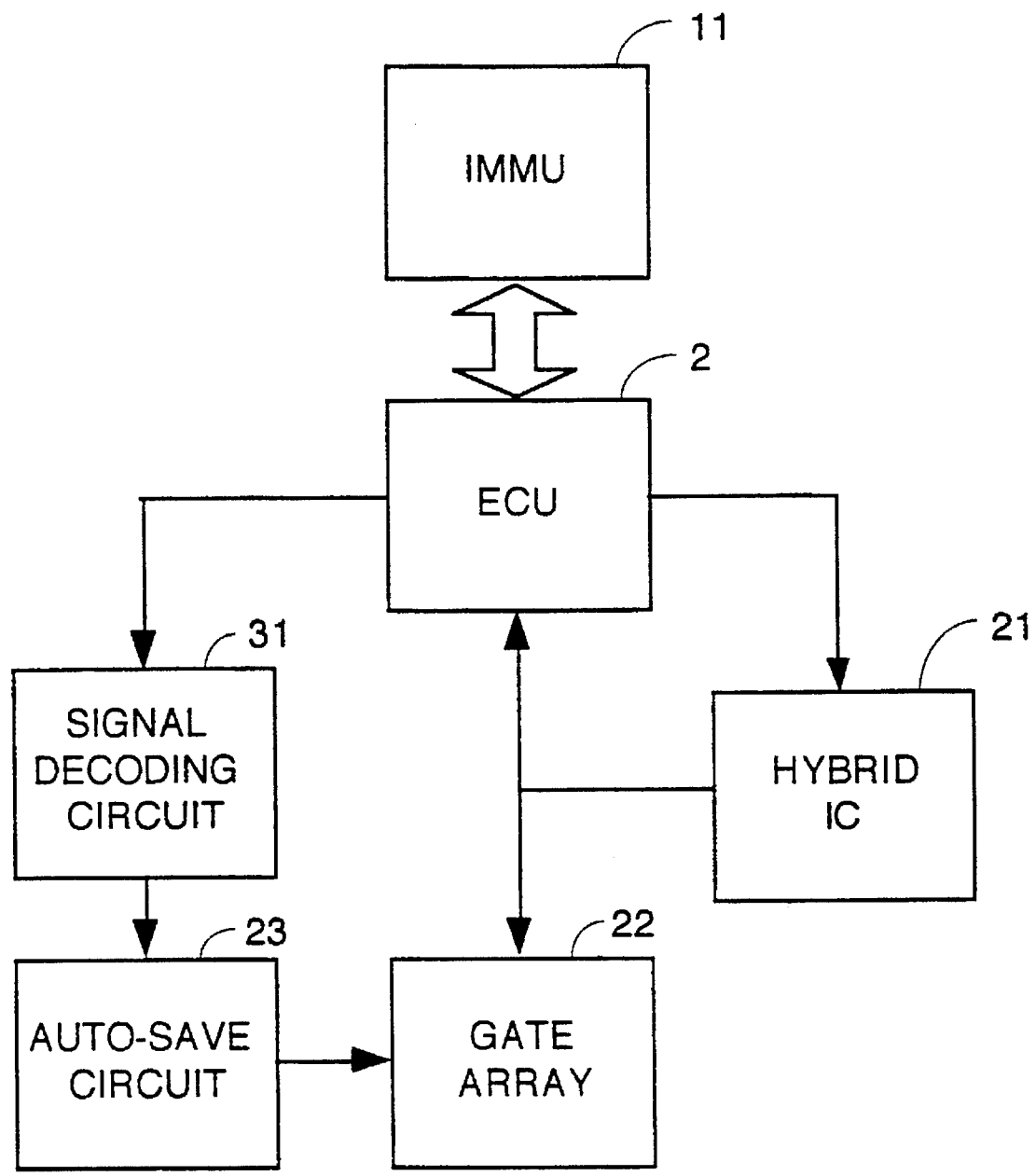
FIG. 9 is a schematic diagram of the essential parts of the anti-theft device according to a second embodiment of this invention.

FIG. 9 shows a second embodiment of this invention.

Figure 10:
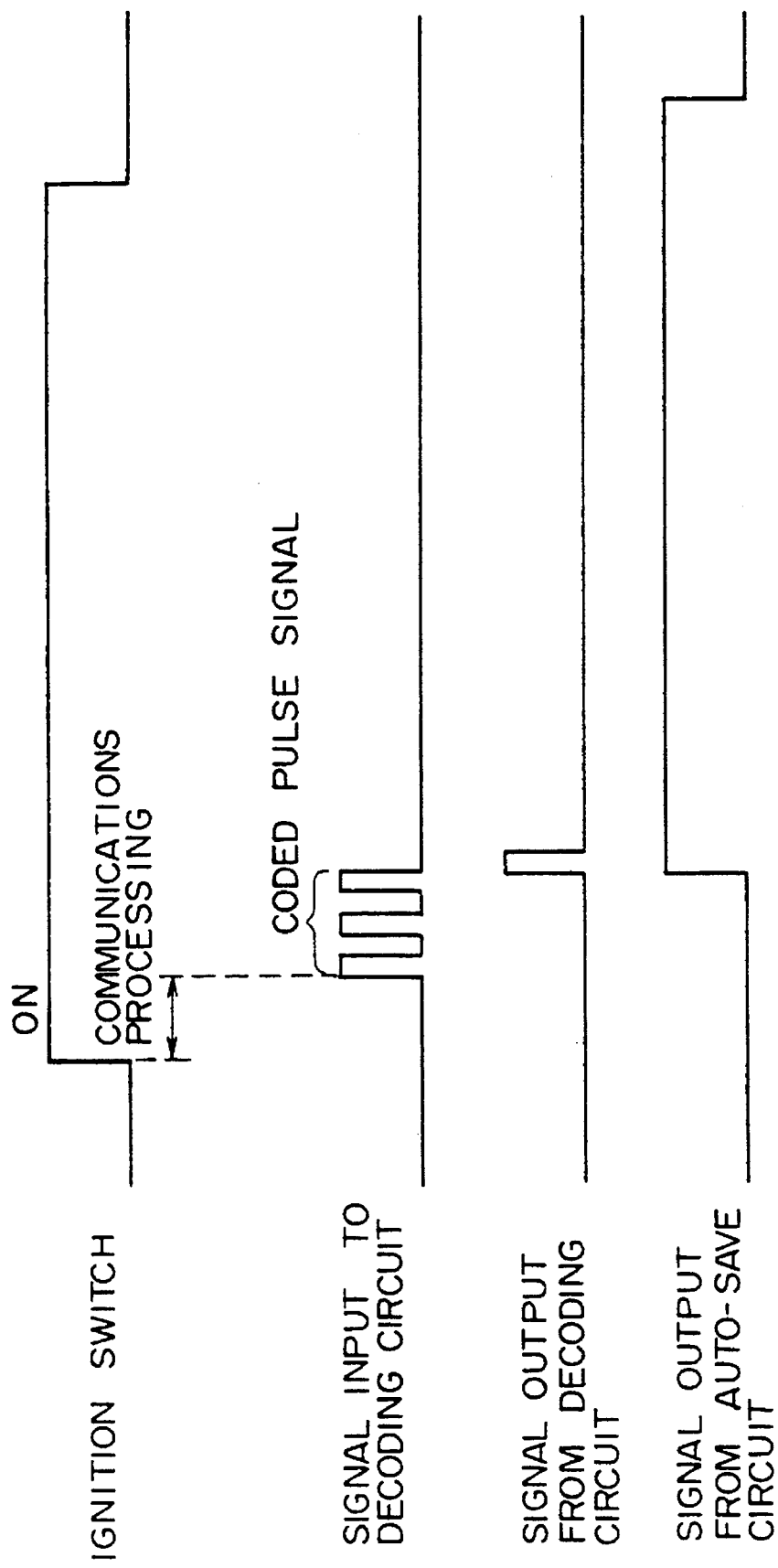
FIG. 10 is a waveform diagram of signals according to the second embodiment of this invention.

According to this embodiment, the output signal from ECU 2 indicating that the identifying codes are identical, is a coded pulse wave signal (PWM) as shown in FIG. 10. A signal decoding circuit 31 that outputs an ON pulse only when the code regenerated from this pulse wave signal is identical to a predetermined code, is provided between ECU 2 and the circuit 23. This decoding circuit 31 comprises a demodulating circuit and a logic circuit, the remaining features of the construction being identical to those of the first embodiment.

Figure 11:
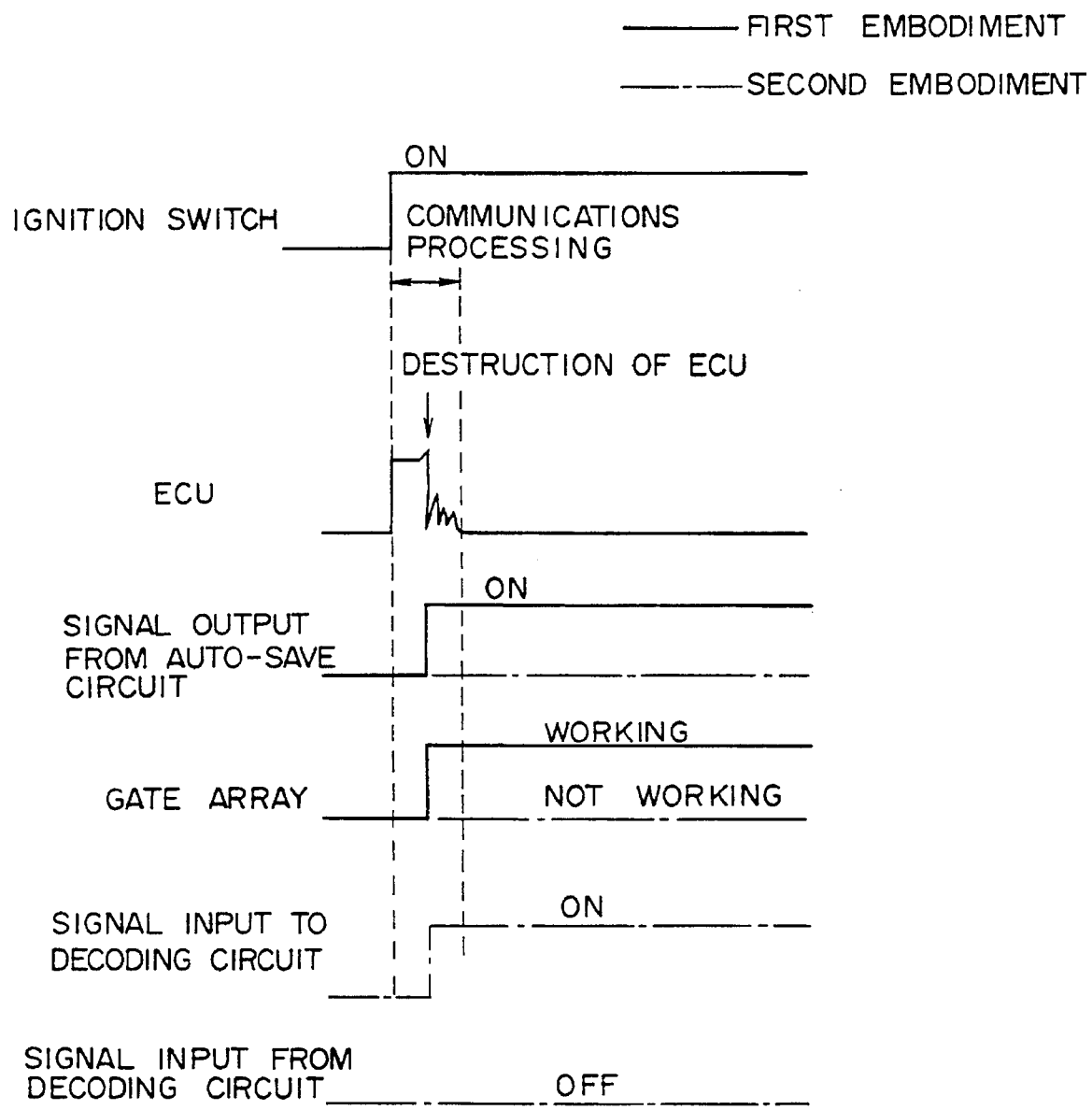
FIG. 11 is a waveform diagram of signals when the ECU is intentionally damaged, according to the second embodiment of this invention.

According to the aforesaid first embodiment, if a fault occurs in the ECU 2 before the comparison of identifying codes has finished, the circuit 23 may instantaneously output an ON signal due to the reaction of ECU 2 to the fault. In such a case, as shown by the solid line in FIG. 11, the output of the circuit 23 is ON, and the gate array 22 performs back-up even when the identifying codes are not identical.

According to the second embodiment on the other hand, the decoding circuit 31 does not output an ON pulse when the ON signal from ECU 2 is output only instantaneously, as shown by the dotted line in the figure, so the gate array 22 does not perform back-up.

The reason why the output signal of ECU 2 showing coincidence of identifying codes was made a PWM signal is in order to distinguish it from the simple ON signal that may be issued when ECU 2 is damaged. Provided that a distinction may be made from the simple ON signal, therefore, this signal does not necessarily have to be a PWM signal.

Figure 12:
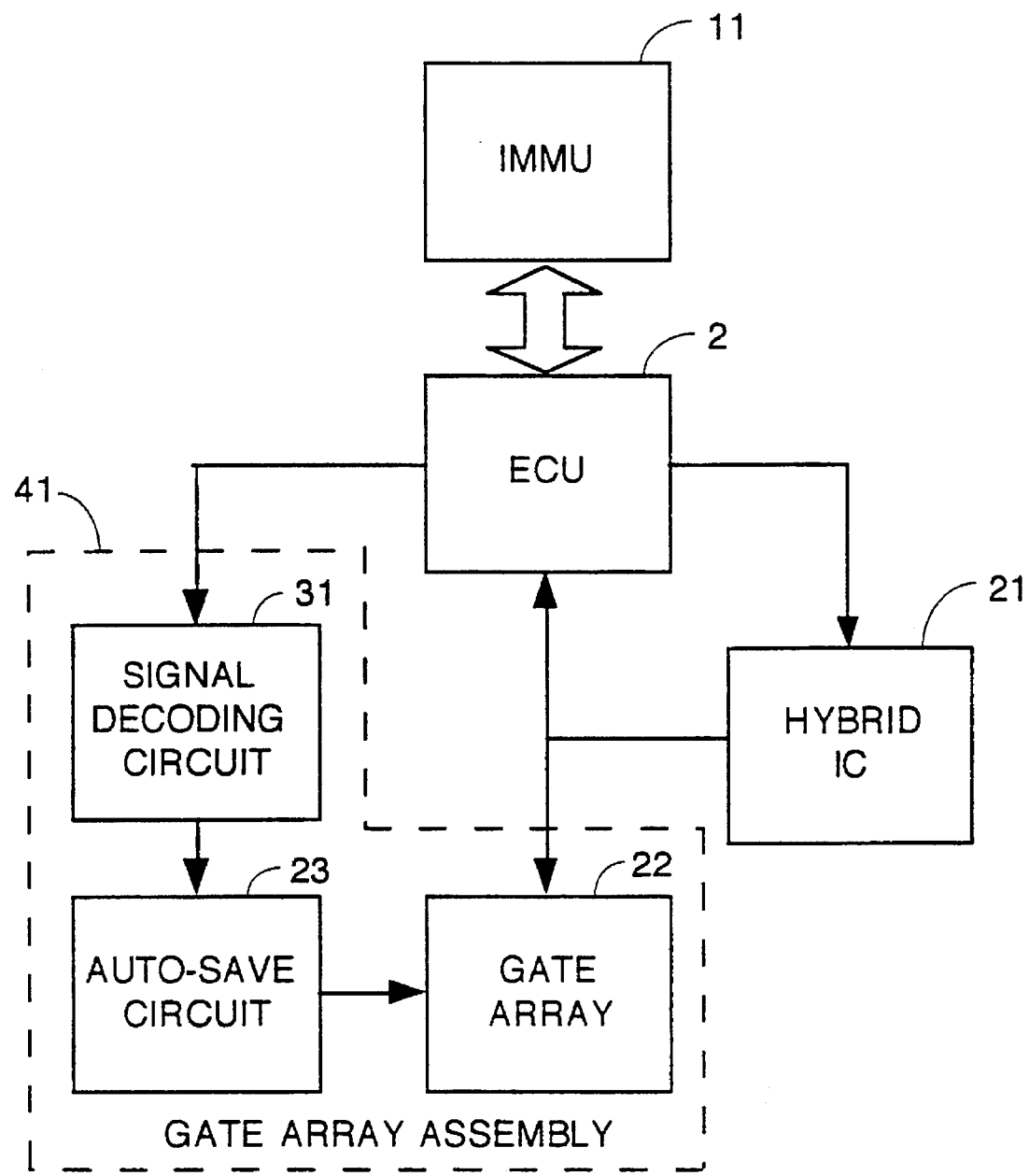
FIG. 12 is a schematic diagram of the essential parts of an anti-theft device according to a third embodiment of this invention.

FIG. 12 shows a third embodiment of this invention.

According to this embodiment, the signal decoding circuit 31 and auto-save circuit 23 are incorporated in the gate array 22 so as to form a gate array assembly 41.

According to the aforesaid second embodiment, the gate array 22 may perform back-up even when the identifying codes are not the same if a pulse that is ON for a fixed time is deliberately input to the circuit 23 or an ON signal is directly input to the gate array 22.

By incorporating the decoding circuit 31 and circuit 23 in the gate array 22, the possibility that the gate array 22 performs back-up is eliminated in all cases excepting when a coded pulse wave is input to the assembly 41. This provides an enhanced measure of safety against theft of the vehicle.

Figure 13:
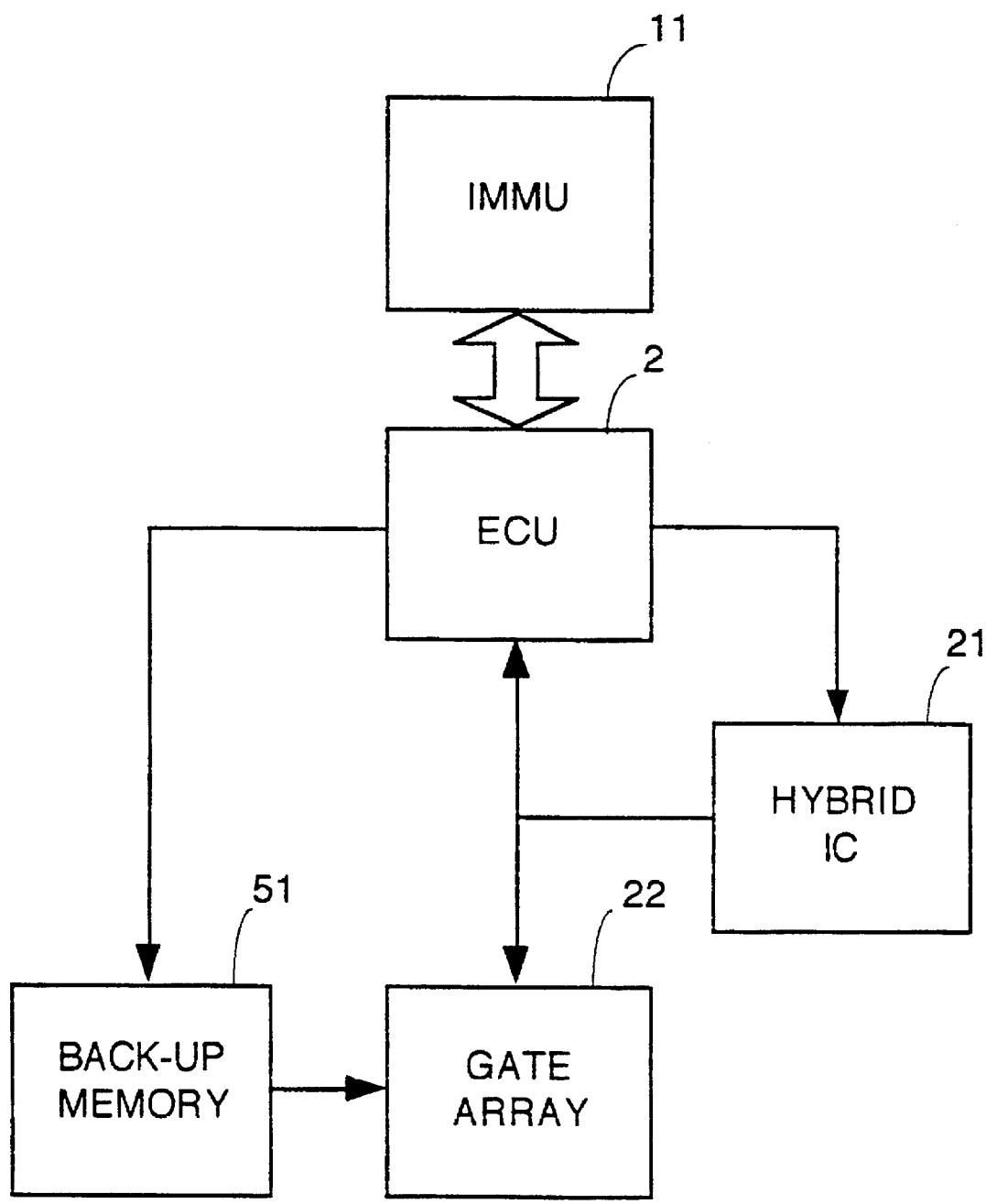
FIG. 13 is a schematic diagram of the essential parts of the anti-theft device according to a fourth embodiment of this invention.
Figure 14:
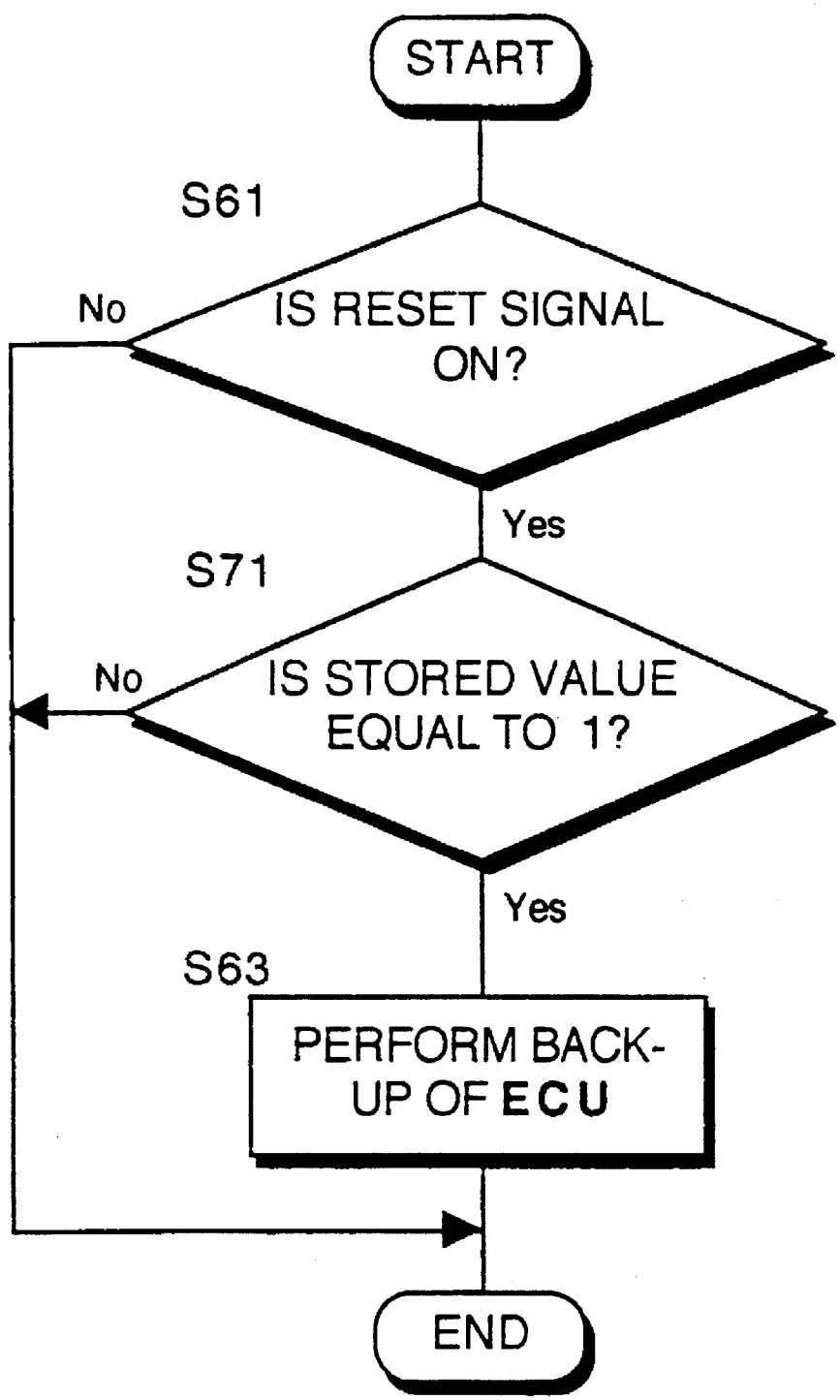
FIG. 14 is a flowchart showing the process of determining whether to allow back-up according to the fourth embodiment of this invention.
Figure 15:
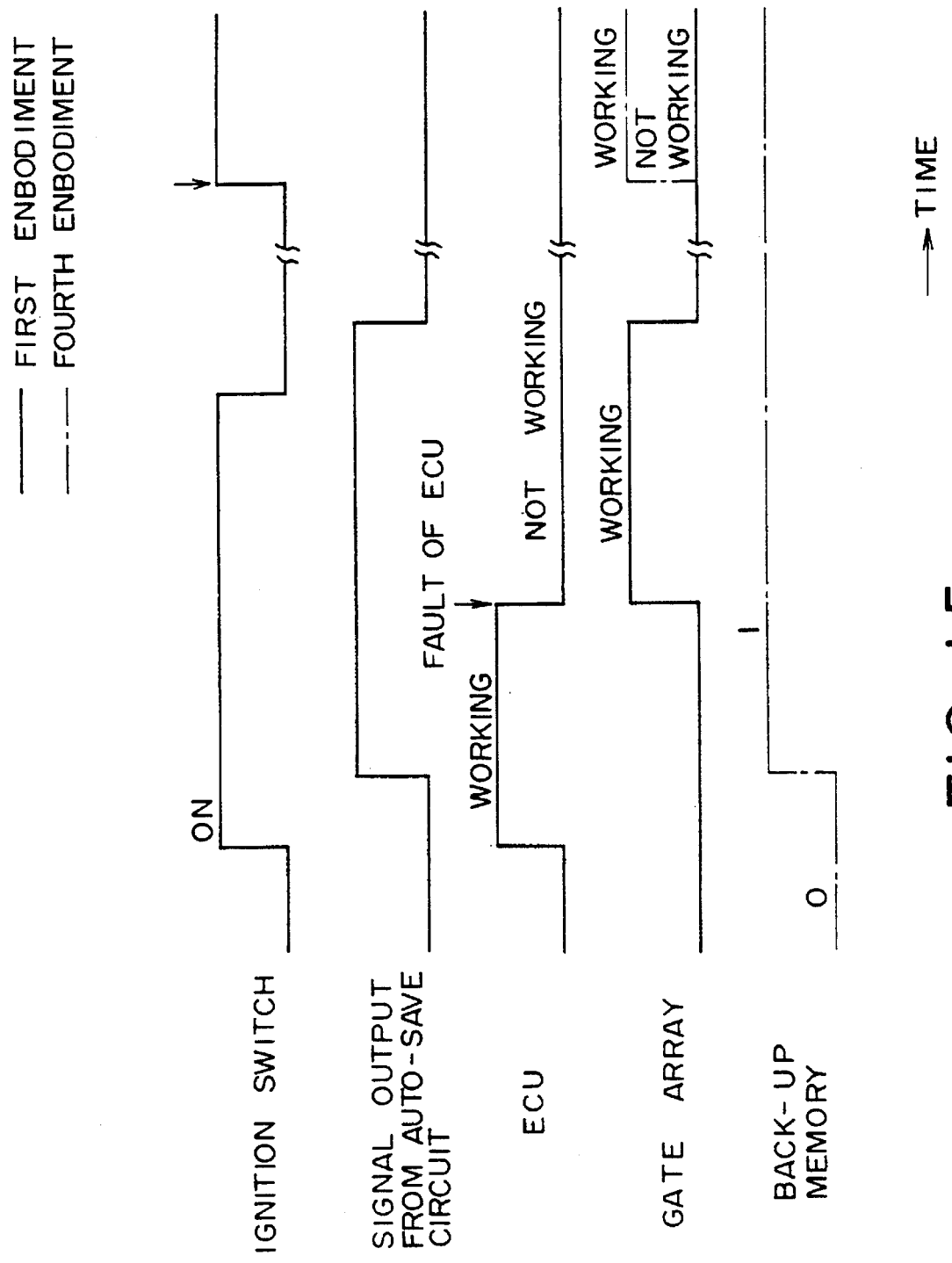
FIG. 15 is a waveform diagram showing signals when the ECU is accidentally damaged, according to the fourth embodiment of this invention.

FIGS. 13–15 show a fourth embodiment of this invention.

Instead of the auto-save circuit 23, this device comprises a back-up memory 51 such as an EEPROM, flash memory or RAM with special power supply. The memory 51 receives an output signal from ECU 2 indicating coincidence of identifying codes, and different values are stored depending on whether or not the codes are identical. This memory value is stored even after the engine has stopped. The stored value may for example be "1" if the codes are identical, and "0" if they are not.

Further, the processing contents of the gate array 22 are updated as shown in FIG. 14. For this purpose, the step S62 in FIG. 6 is replaced by a step S71, and the routine proceeds to a step S63 if the following two conditions are satisfied:

(1) The reset signal is ON (step S61)

(2) The value stored in the back-up memory is "1" (step 71)

According to the first embodiment, if the engine is stopped after back-up by the gate array makes it possible to continue running when a fault occurs in the ECU 2, the auto-save function of the circuit 23 is released and the output of the circuit 23 switches OFF as shown by the solid line in FIG. 15. When an attempt is made to restart the engine, therefore, the gate array 22 does not perform back-up, and the engine cannot be restarted.

According to the third embodiment, even if the engine has stopped after a fault in the ECU 2, the value "1" indicating that the identifying codes are identical is retained in the back-up memory 51. The gate array 22 therefore performs back-up when an attempt is made to restart the engine, so the engine can be restarted as shown by the semi-dotted line in FIG. 15.

Figure 16:
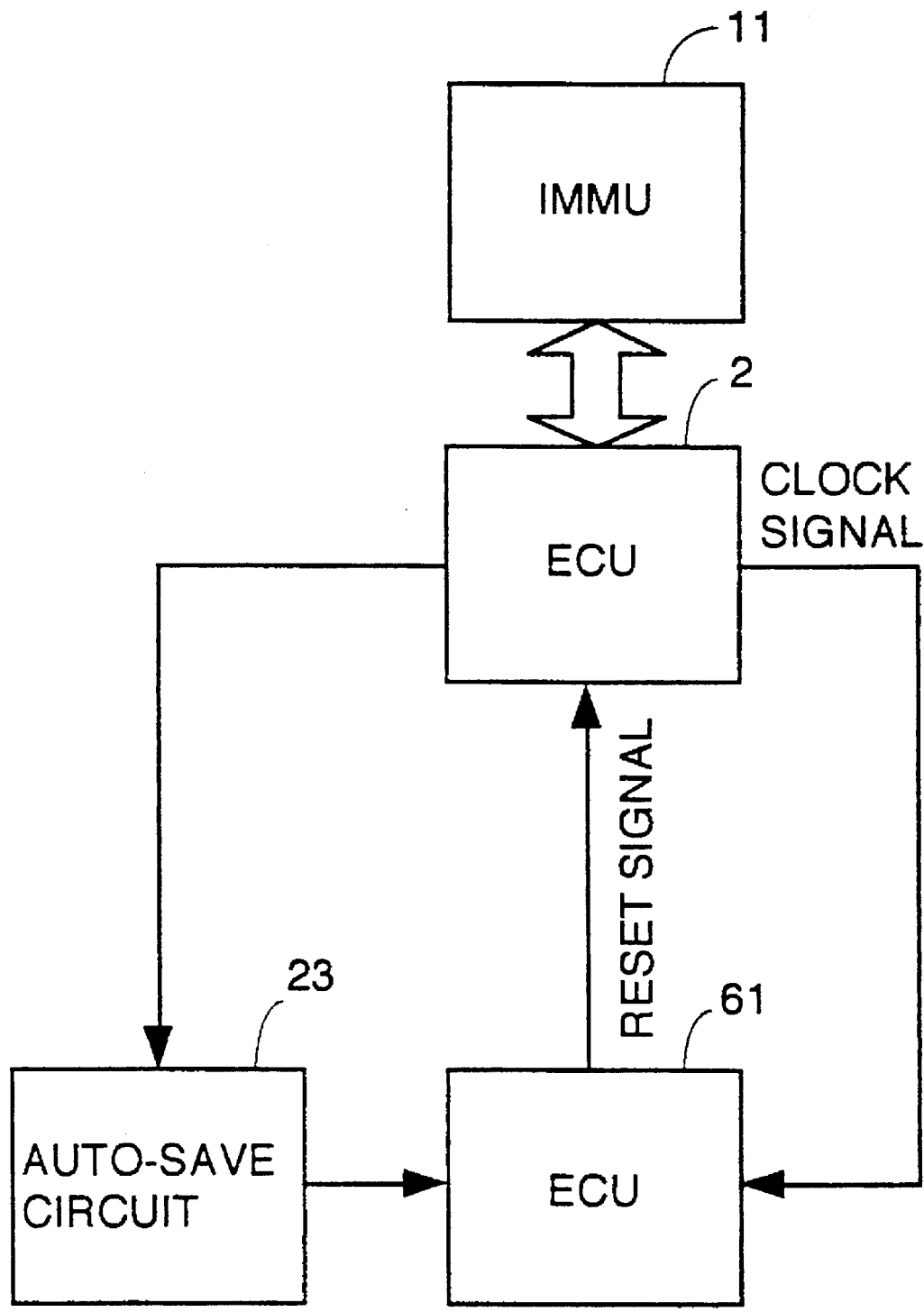
FIG. 16 is a schematic diagram of the essential parts of the anti-theft device according to a fifth embodiment of this invention.

Instead of providing a separate power supply battery hybrid IC 21 and gate array 22, these functions may be provided by one device such as an ECU. The hybrid IC 21 and gate array 22 may for example comprise an ECU 61 formed of a microprocessor, as shown in FIG. 16.

Figure 17:
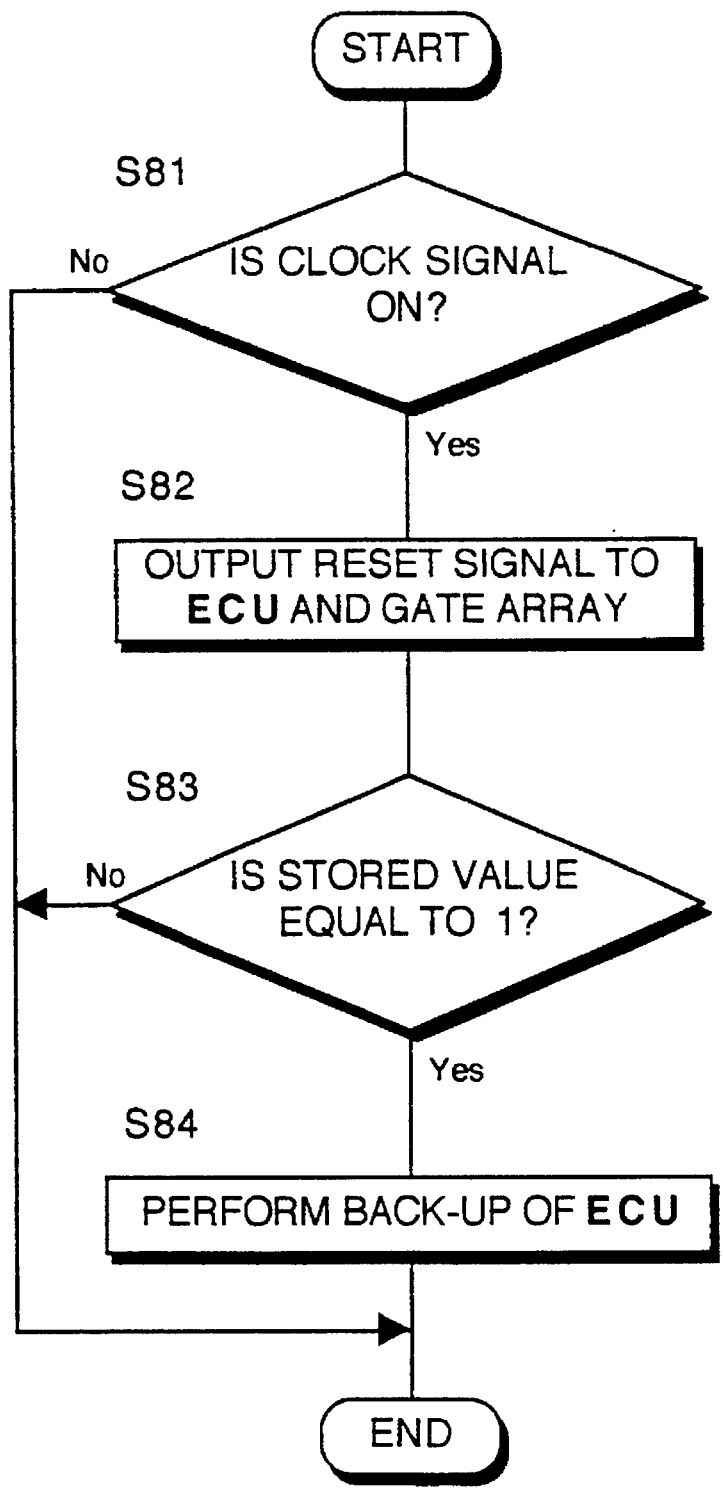
FIG. 17 is a flowchart showing the process of determining whether to allow back-up according to the fifth embodiment of this invention.

The ECU 61 performs the operations shown in FIG. 17. When the ECU 2 has stopped outputting a clock signal in a step S81, a reset signal is output to stop operation of the ECU 2 in a step S82, and a reset signal is simultaneously output to the built-in gate array. Then, in a step S83, when the output signal of the circuit 23 is ON, back-up is performed in a step S84.

Figure 18:
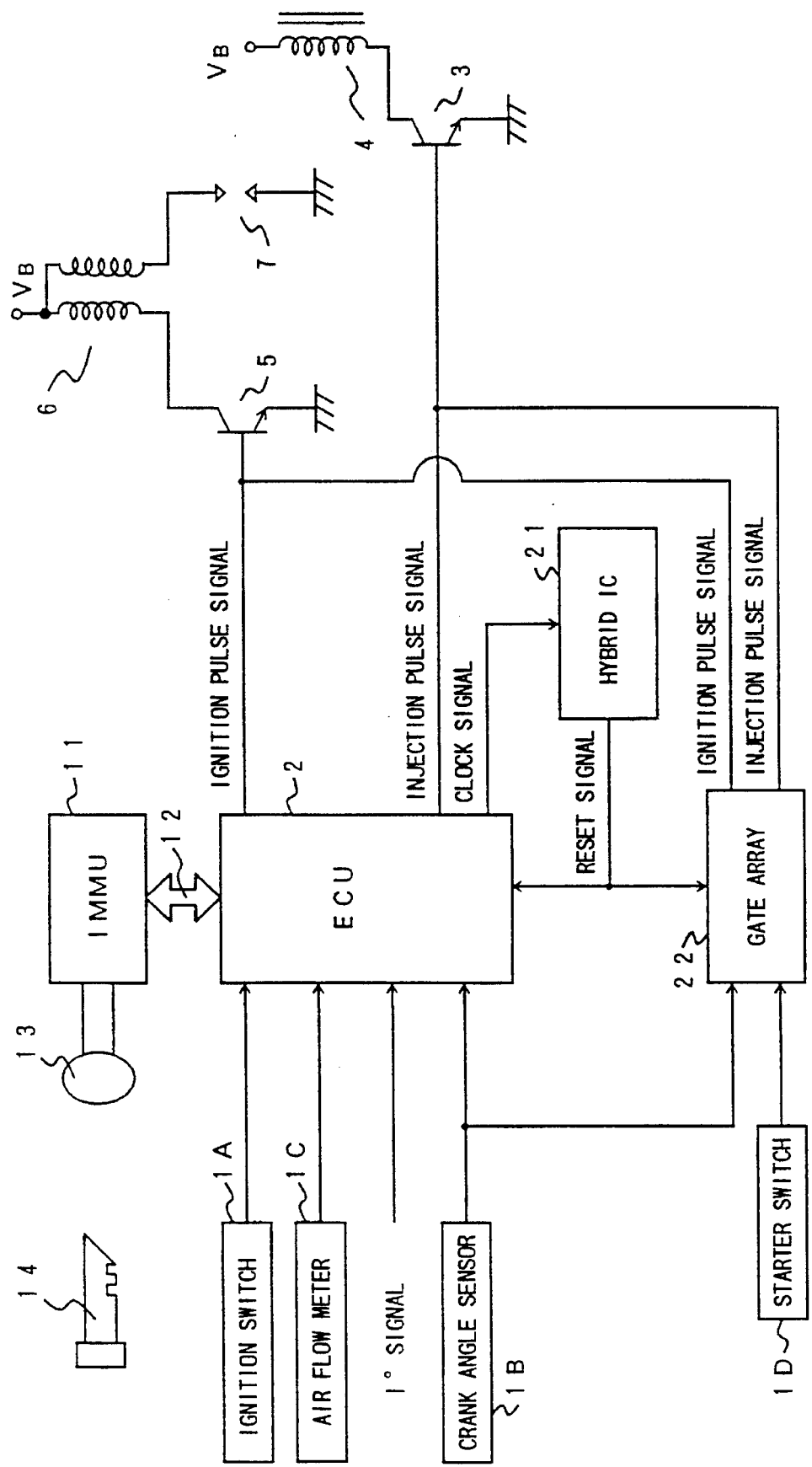
FIG. 18 is similar to FIG. 1, but showing a sixth embodiment of this invention.
Figure 19:
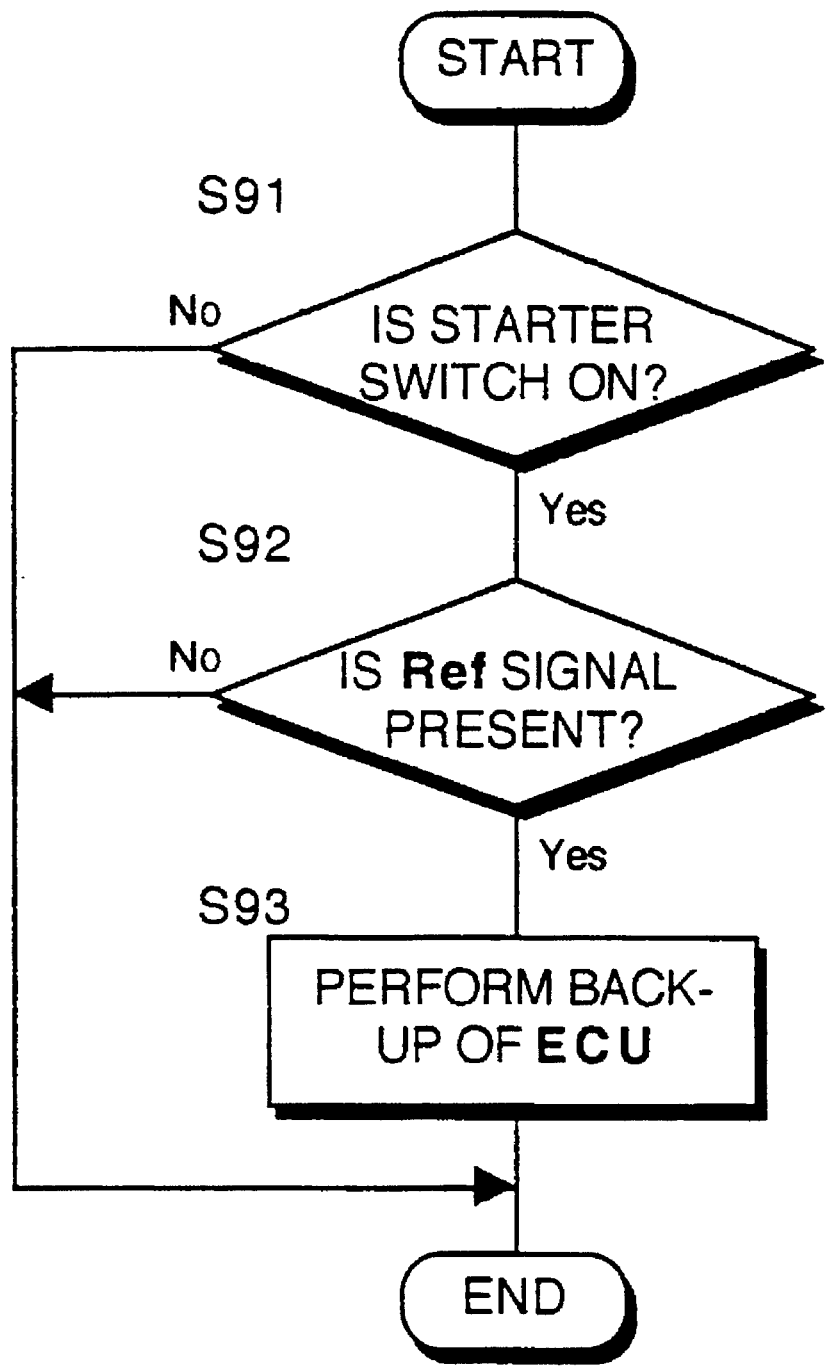
FIG. 19 is a flowchart showing the process of determining whether to allow back-up according to the sixth embodiment of this invention.
Figure 20:
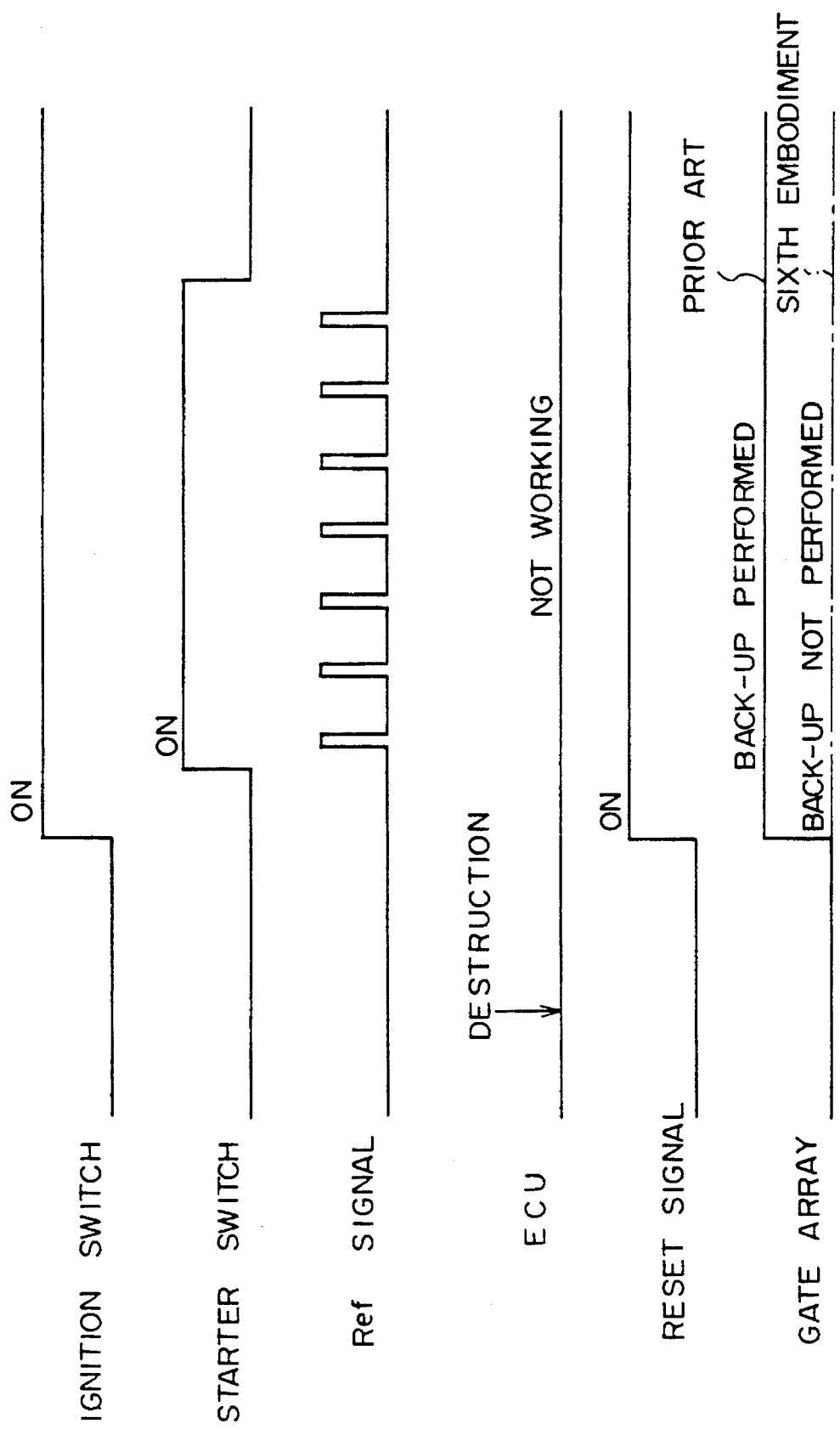
FIG. 20 is a waveform diagram of signals when the ECU is intentionally damaged, according to the sixth embodiment of this invention.

FIGS. 18–20 show a sixth embodiment of this invention.

The difference between this embodiment and the first embodiment is that, as shown in FIG. 18, instead of providing the circuit 23, back-up is allowed or disallowed based on an input signal from a starter switch 1D that performs engine start-up.

When the ignition switch is turned to the START position as described hereintofore, the starter switch goes ON, and the starter cranks the crankshaft. When engine start-up is complete, the starter switch goes OFF. A signal showing whether the starter switch is ON or OFF is directly input to the gate array 22. If ECU 2 has a fault, the starter switch is OFF and the Ref signal is input, the gate array 22 allows back-up.

When the reset signal is ON, the gate array 22 is activated, and the determining process shown in FIG. 19 is executed. In other words, provided the following two conditions are satisfied, the routine proceeds to a step S93 and back-up of ECU 2 is performed. At other times, the routine does not proceed to the step S93.

(1) The starter switch is not ON (step S91)

(2) The Ref signal is present (step S92)

According also to this embodiment, backup is performed as in the first embodiment when the identifying codes are identical. FIG. 20 is a waveform diagram showing the case when ECU 2 is damaged before start-up, i.e. when the ignition switch is OFF, and the starter switch then goes ON.

In this case, the engine rotates when the starter switch goes ON. However, although the Ref signal is input to the gate array 22, back-up is not performed during cranking as the starter switch is ON. The engine therefore does not start.

In the embodiments from the first to the fifth embodiments, an ON signal was output by the circuit 23 when the identifying codes were identical, as shown by the step S26 of FIG. 3, however by adding the condition that the starter switch is OFF to the conditions for allowing back-up, this step is no longer necessary.

Figure 21:
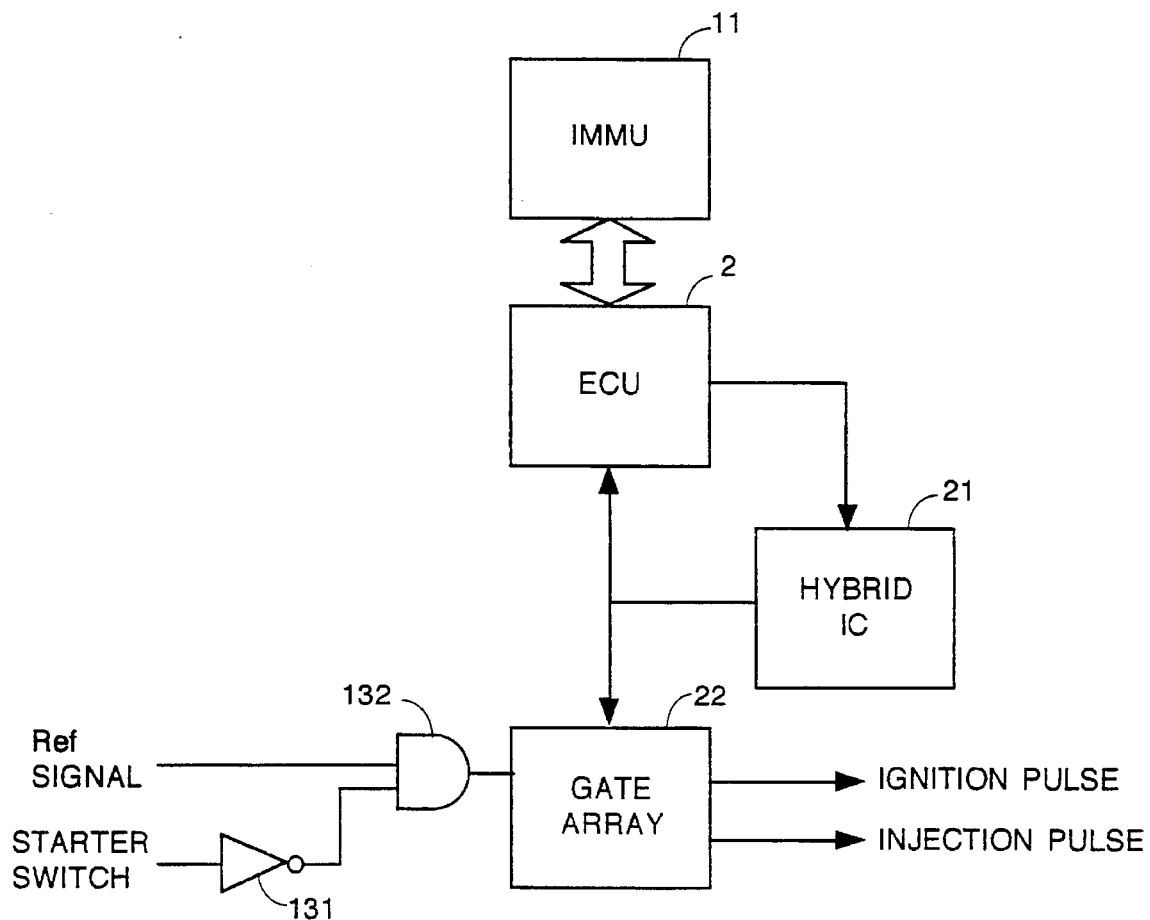
FIG. 21 is a schematic diagram of the essential parts of the anti-theft device according to a seventh embodiment of this invention.

FIG. 21 shows a seventh embodiment of this invention. In this case, the signal from the starter switch is inverted by a NOT circuit 131 or an inverter, and the inverted signal and Ref signal are input to the gate array 22 via an AND circuit 132.

When the starter switch is OFF, therefore, the Ref signal is input to the gate array 22, and when the starter switch is ON, the Ref signal is not input to the gate array 22 as it is blocked by the AND circuit 132, so back-up is not performed.

Figure 22:
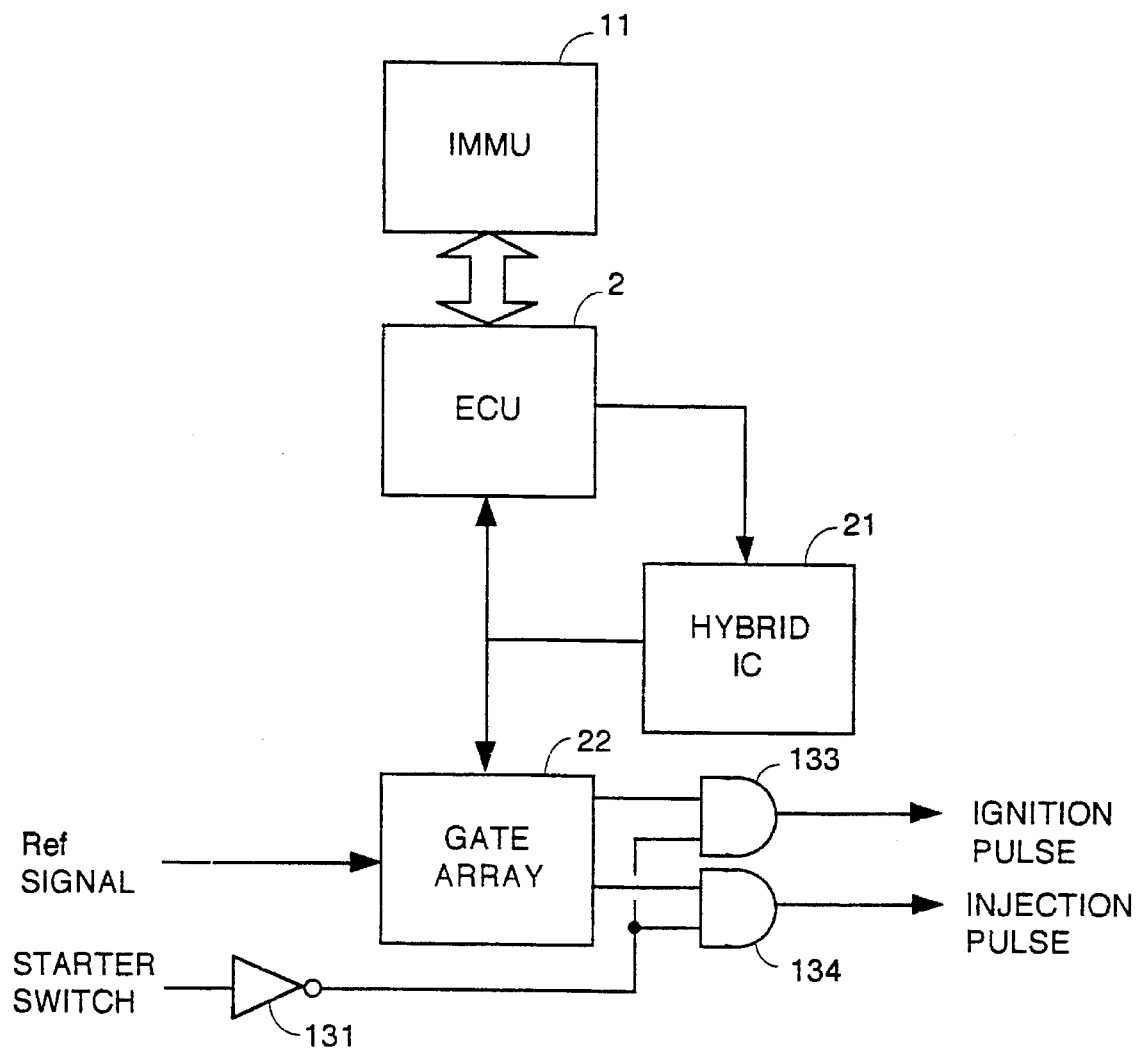
FIG. 22 is a diagram of the essential parts of the anti-theft device according to an eighth embodiment of this invention.

FIG. 22 shows an eighth embodiment of this invention. According to this embodiment, the inverted signal from the NOT circuit 131 and ignition pulse signal output by the gate array 22 are input to an AND circuit 133, while the inverted signal from the NOT circuit 131 and an ignition timing signal output by the gate array are input to an AND circuit 134. The outputs of the AND circuits 133 and 134 are respectively output as an injection pulse signal and ignition pulse signal to the fuel spray injector and spark plug. In the case of this embodiment also, back-up is not performed unless the starter switch is OFF. Further, either one of the AND circuits 133, 134 may be omitted.

According to the aforesaid seventh and eighth embodiments, the determining of whether or not to allow back-up may be performed merely by adding AND circuits, hence an anti-theft function can easily be added to a vehicle having back-up means.

Figure 23:
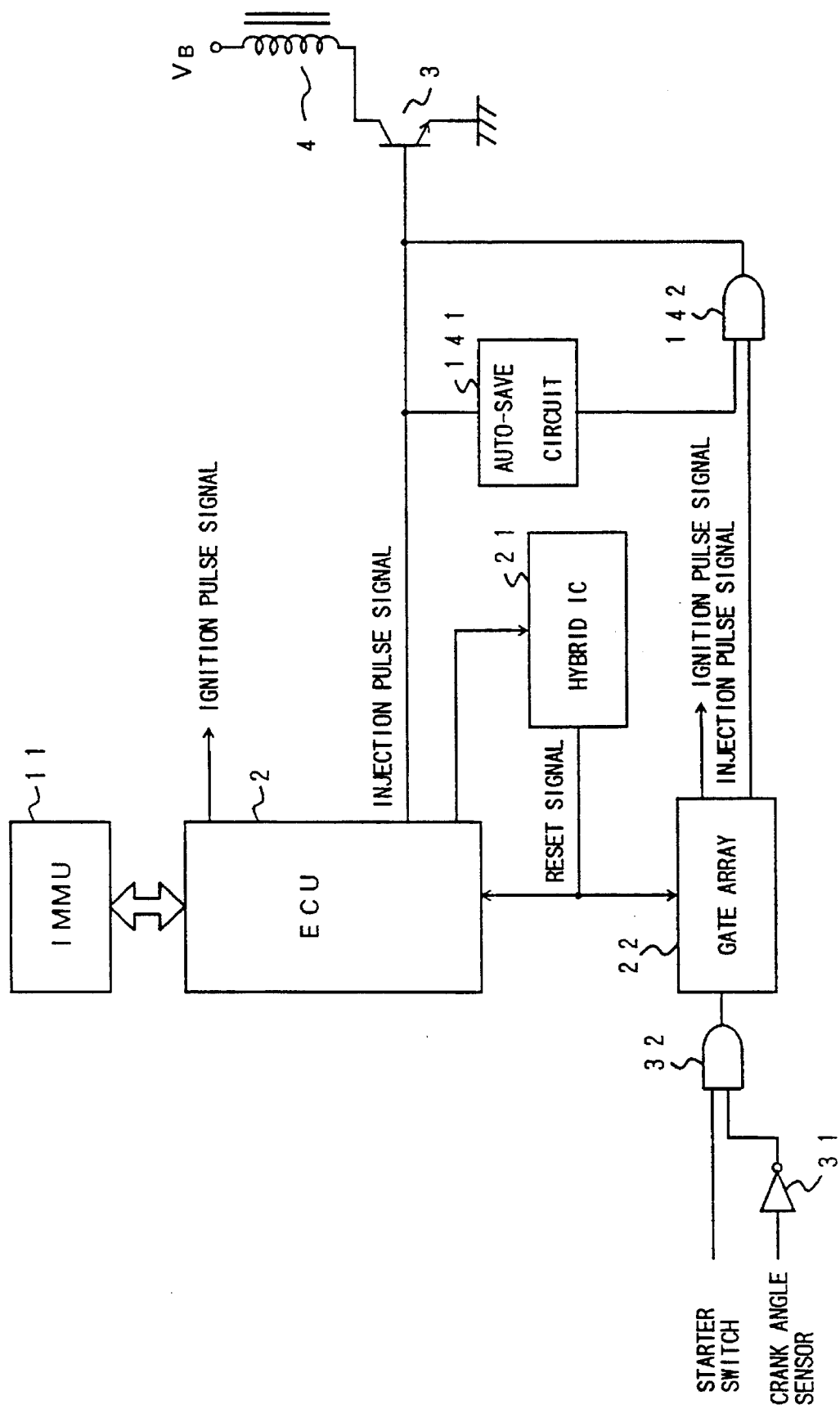
FIG. 23 is similar to FIG. 1, but showing a ninth embodiment of this invention.
Figure 24:
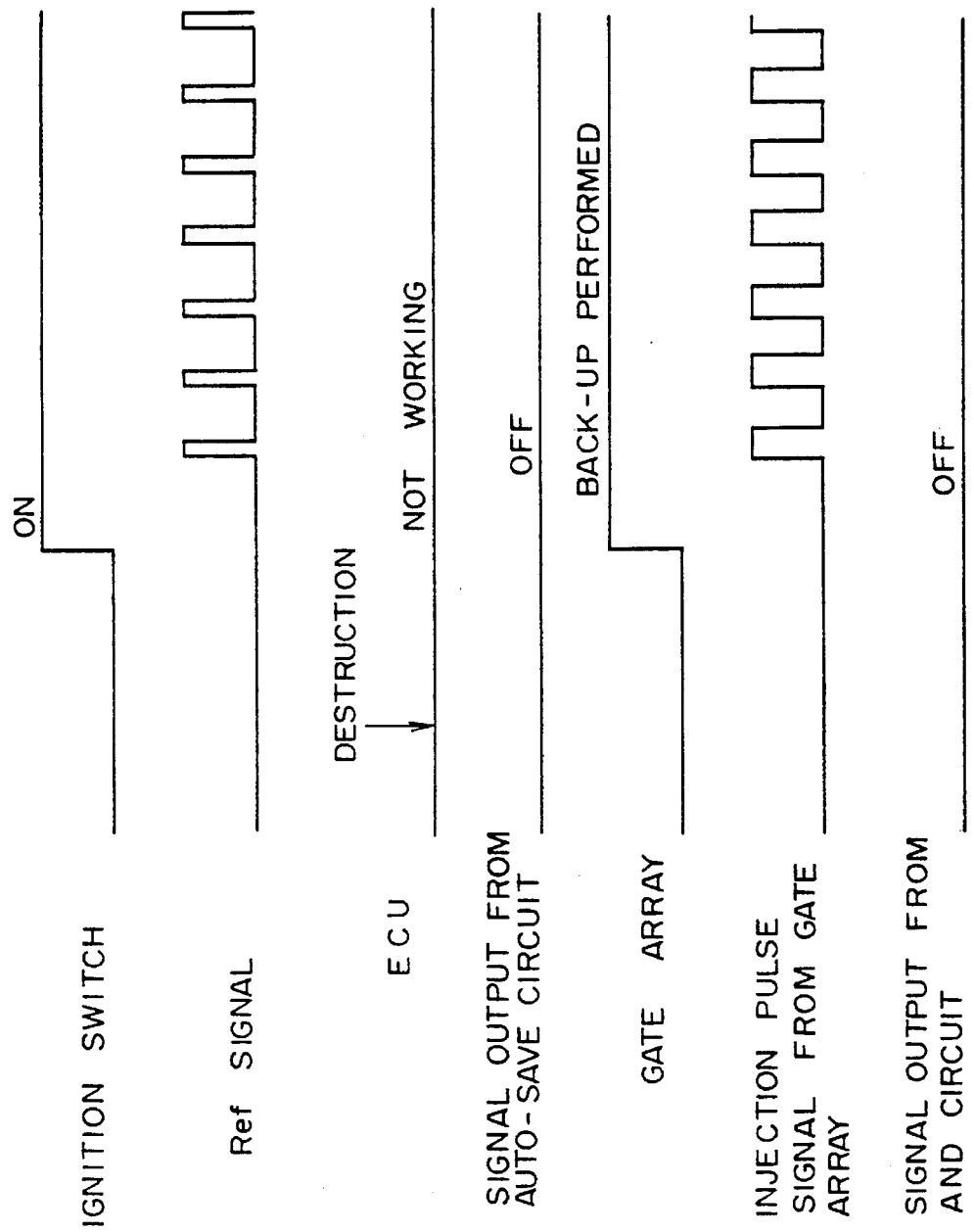
FIG. 24 is a waveform diagram of signals when the ECU is intentionally damaged, according to the ninth embodiment of this invention.
Figure 25:
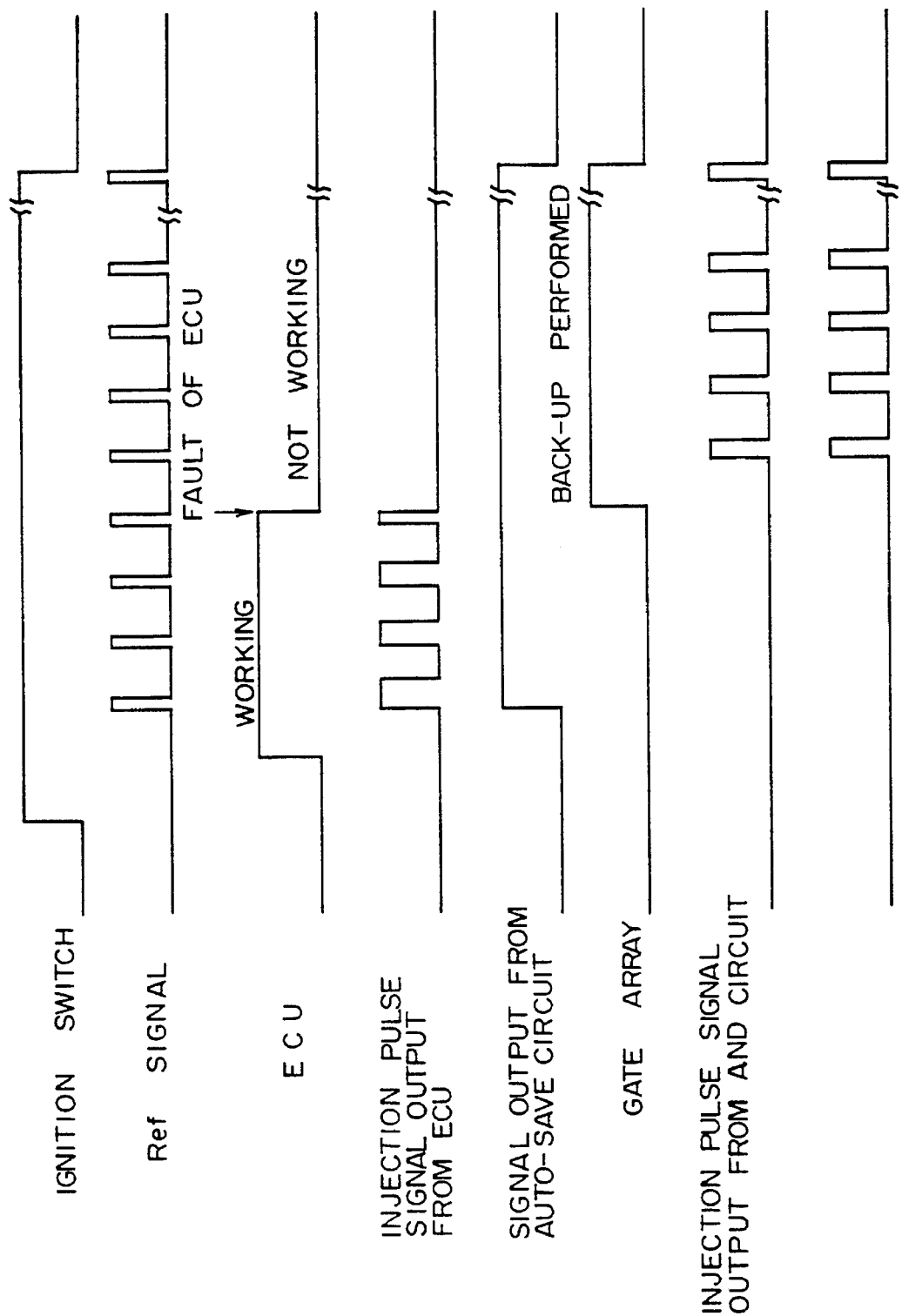
FIG. 25 is a waveform diagram of signals when the ECU is accidentally damaged, according to the ninth embodiment of this invention.

FIGS. 23–25 show a ninth embodiment of this invention.

According to this embodiment, in addition to the seventh embodiment, an auto-save circuit 141 is provided that switches an output signal ON even if the injection pulse signal from ECU 2 is ON only once. The output of the circuit 141 and the injection pulse signal from the gate array 22 are input to an AND circuit 142, and the output of the AND circuit 142 is input to the transistor 3 as an injection pulse signal. When the engine stops, the circuit 141 is reset, and the output signal returns to OFF.

In the aforesaid seventh embodiment, if ECU 2 is damaged when the ignition switch is OFF, and cranking of the engine is then performed by pushing the vehicle without switching the starter switch to ON, the Ref signal is input to the gate array 22 via the AND circuit 32, back-up is performed by the gate array 22, and the engine starts running.

According to this embodiment, if ECU 2 is damaged when the ignition switch is OFF, even if an injection pulse is output due to back-up by the gate array 22 when the vehicle is pushed, the output of the circuit 141 remains OFF. The injection pulse signal output by the gate array 22 therefore cannot pass the AND circuit 142 as shown in FIG. 24, and the engine does not start.

If on the other hand a fault occurs in ECU 2 after the engine has started due to coincidence of identifying codes and an injection pulse signal has been output from ECU 2, the output of the circuit 141 is turned ON by the first injection pulse signal as shown in FIG. 25. The injection pulse signal of the gate array 22 therefore passes the AND circuit 142 without modification, and back-up is performed.

In FIG. 23, the circuit 141 and the AND gate 142 were provided in the injection pulse signal line, however they may also be provided in the ignition pulse signal line, or alternatively in both signal lines.

Figure 26:
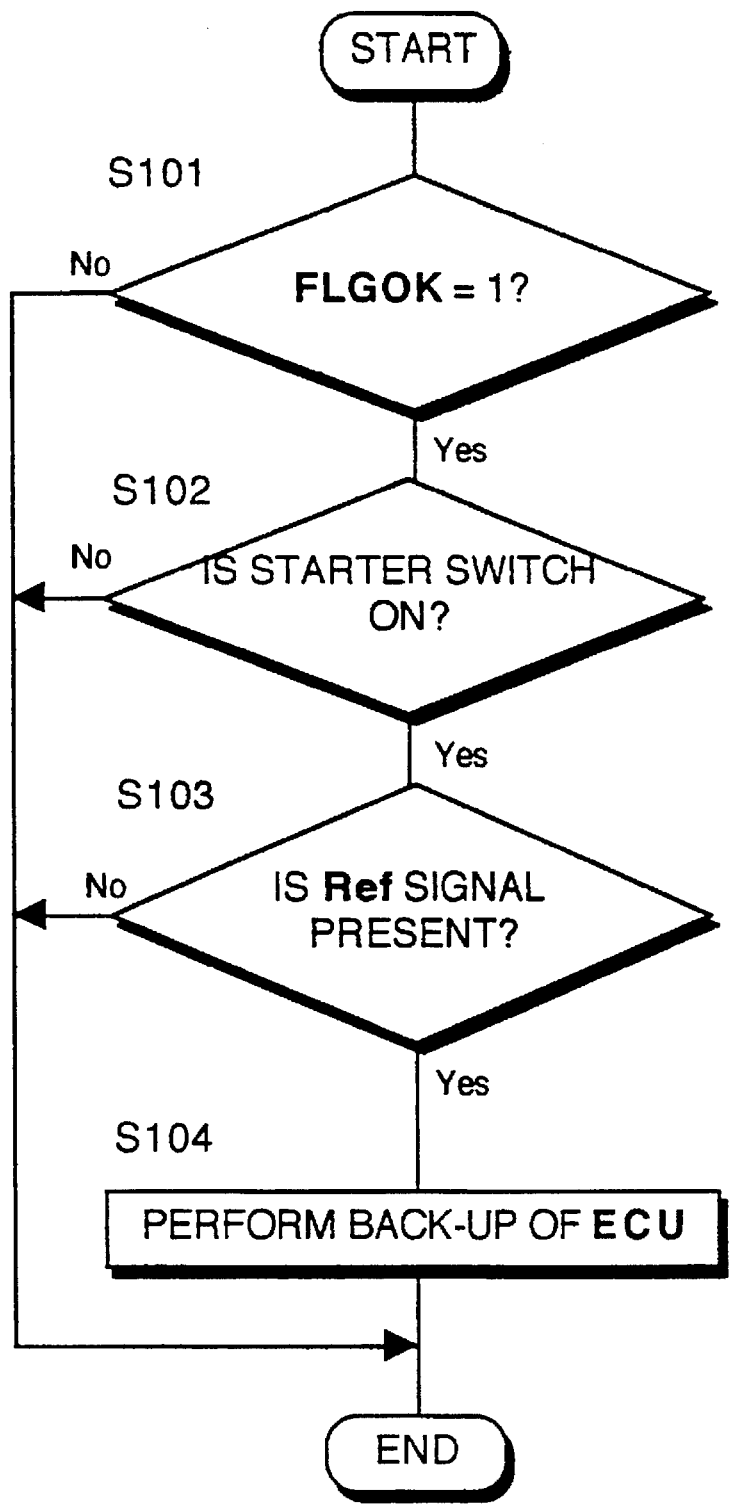
FIG. 26 is a flowchart showing the process of determining whether to allow back-up according to a tenth embodiment of this invention.
Figure 27:
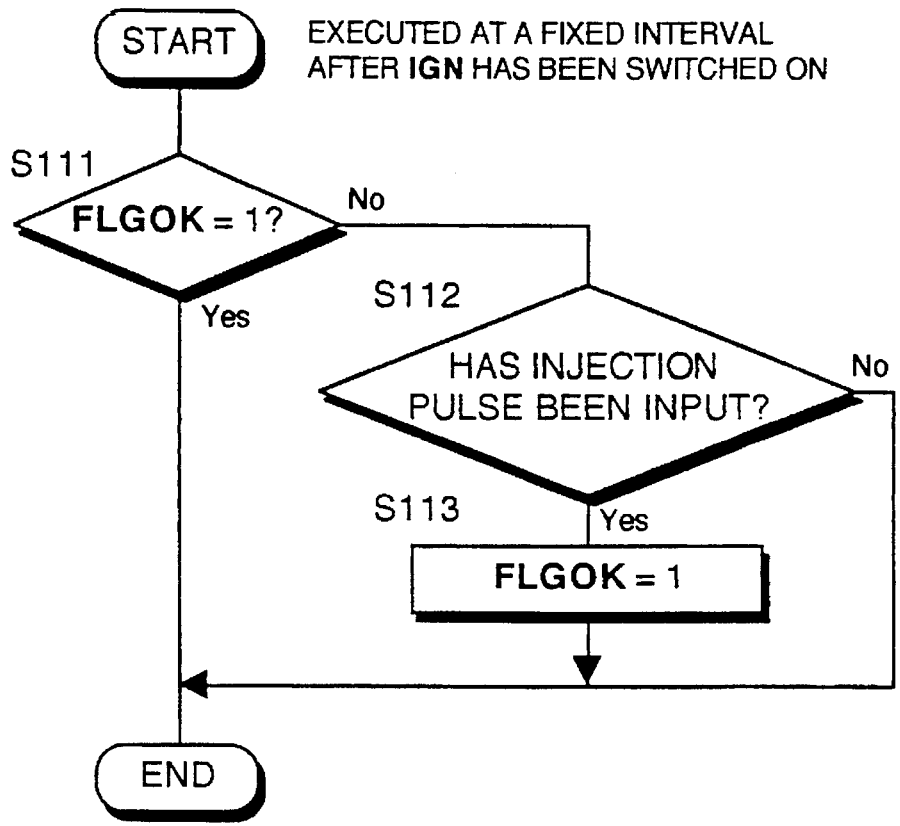
FIG. 27 is a flowchart showing a process of setting a flag FLGOK according to the tenth embodiment of this invention.
Figure 28:
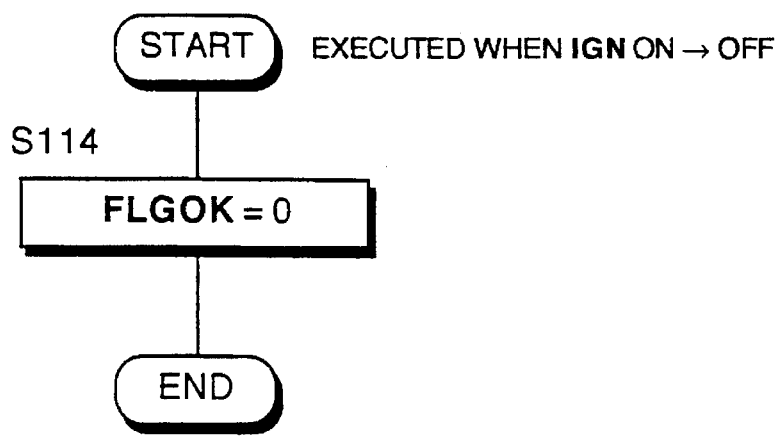
FIG. 28 is a flowchart showing a process of clearing the flag FLGOK according to the tenth embodiment of this invention.

FIGS. 26–28 show a tenth embodiment of this invention. According to this embodiment, a step S101 for determining whether or not a flag FLGOK is equal to 1 is added to the process for determining whether to allow or disallow back-up of FIG. 19. The flag FLGOK is set to "1" if an injection pulse signal is output, even once only, from ECU 2. For this purpose, the injection pulse signal output for example by ECU 2 to the transistor 3 is also input to the gate array 22, and the flag is set when the gate array 22 executes the process shown by the flowchart of FIG. 27 at fixed intervals when the ignition switch is ON. When the FLGOK is not 1 in a step S111, it is determined in a step S112 whether or not an injection pulse signal has been input, and if it has, FLGOK is set equal to 1 in a step S113. On the other hand, when the ignition switch is switched from ON to OFF, this flag FLGOK is cleared as shown by a step S114 in the flowchart of FIG. 28.

According to this embodiment, as in the case of the ninth embodiment, if the ignition switch is OFF and a fault occurs in ECU 2, back-up is not performed and the engine does not run even if the vehicle is pushed as the flag FLGOK is still "0".

However after engine start-up, i.e. after an injection pule signal has been output from ECU 2 even if only once, the vehicle continues running when there is a fault in ECU 2 due to the back-up function.

Figure 29:
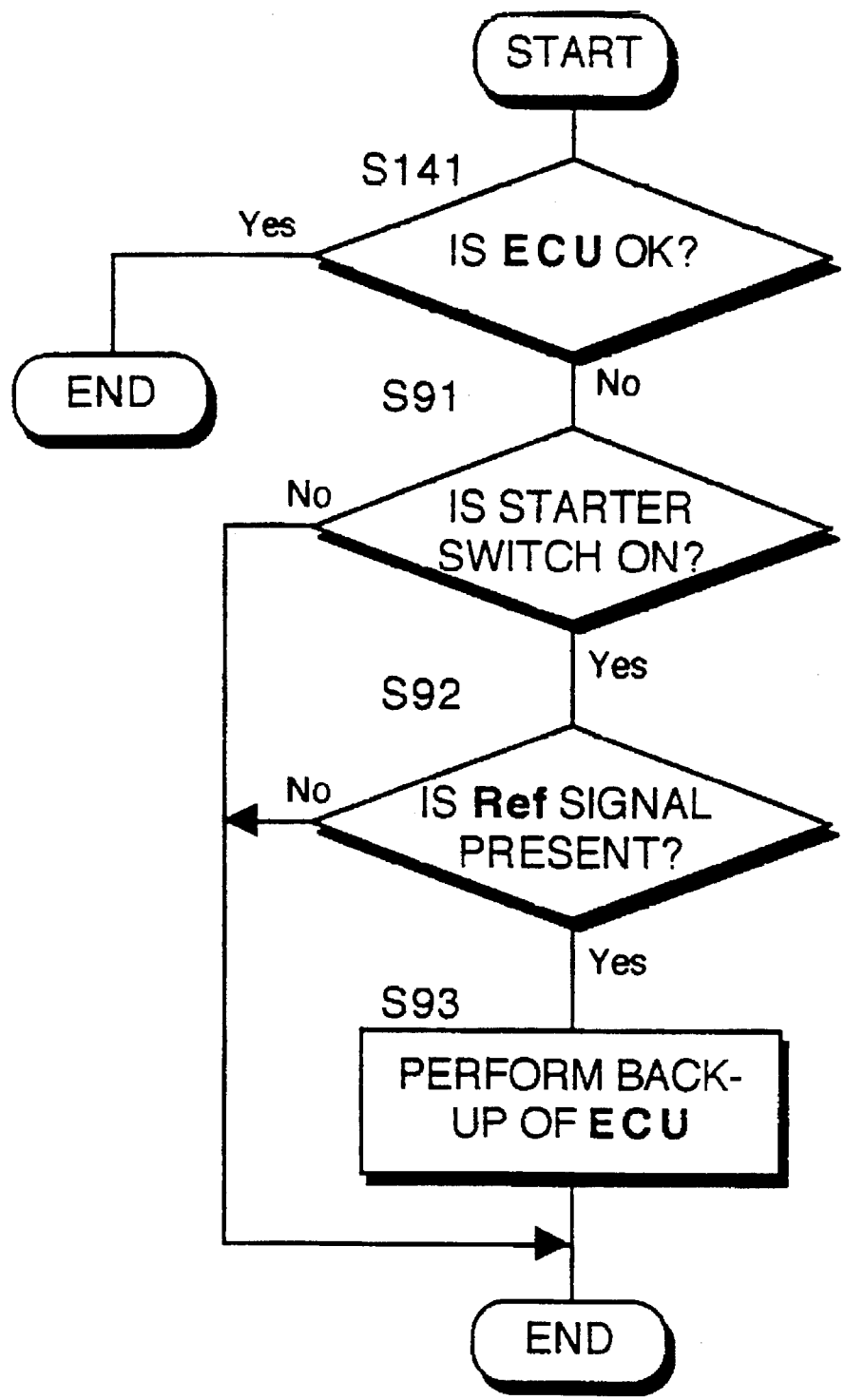
FIG. 29 is a flowchart showing the process of determining whether to allow back-up according to an eleventh embodiment of this invention.
Figure 30:
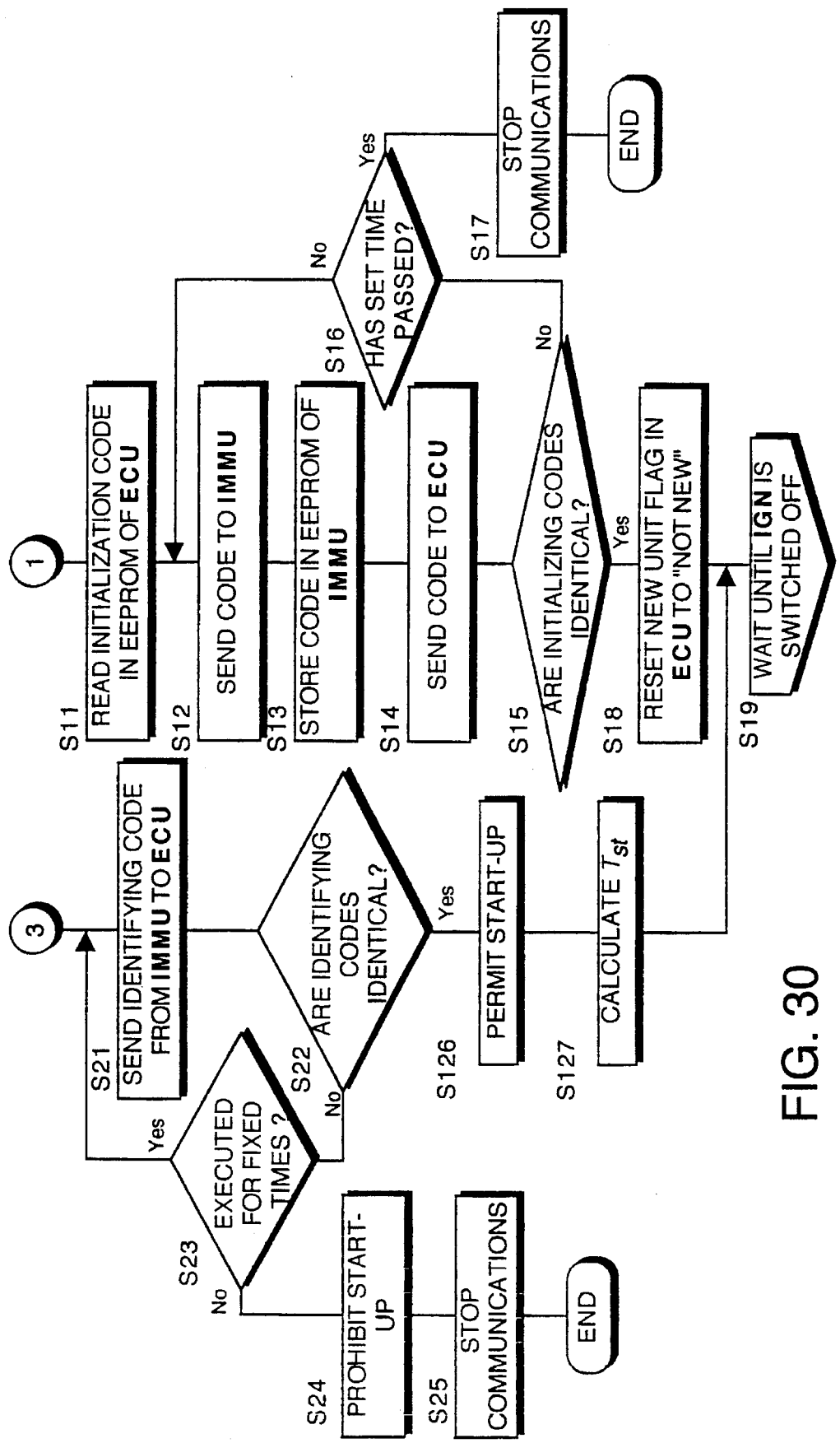
FIG. 30 is similar to FIG. 3, but showing the eleventh embodiment of this invention.
Figure 31:
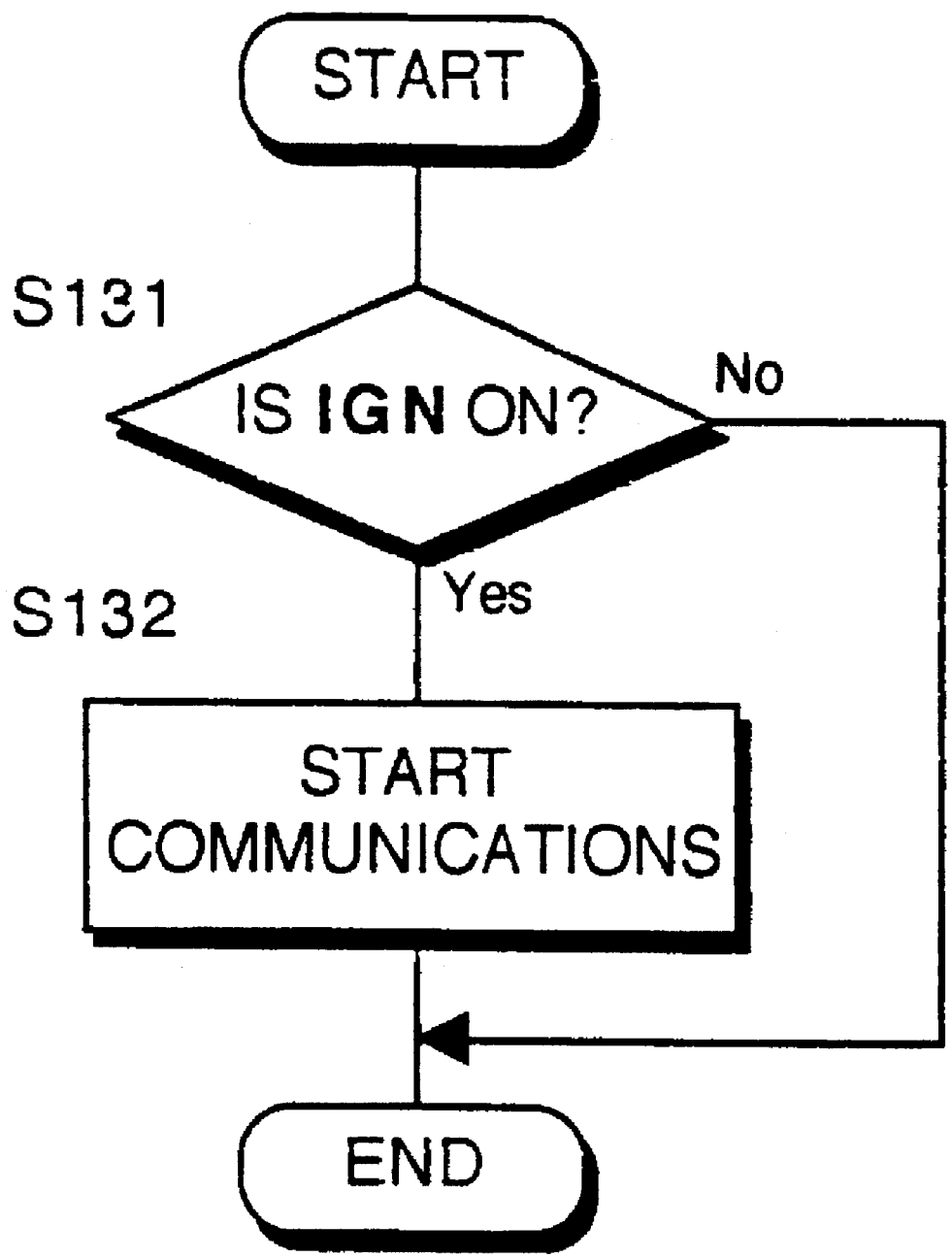
FIG. 31 is a flowchart showing the process of determining whether to allow back-up according to the eleventh embodiment of this invention.

FIGS. 29–31 show an eleventh embodiment of this invention.

This embodiment differs from the sixth embodiment in the following points.

(i) The processing shown by the flowchart of FIG. 29 is performed instead of the flowchart of FIG. 19.

(ii) The processing shown in steps S126, S127 of FIG. 30 is performed instead of the flowchart of FIG. 3.

(iii) A routine shown by the flowchart of FIG. 31 is provided.

Of the above points, (ii) and (iii) are based on differences in the basic concept.

According to the sixth embodiment, when the engine is started up, i.e. provided start-up has been allowed, it is determined whether or not the identifying codes stored in the control units are the same, and if they are not, start-up is prohibited.

In contrast, according to this embodiment, start-up is initially disallowed, and it is first determined whether or not the identifying codes are identical. Start-up is only allowed when coincidence of codes has been established. This modification is represented by (ii) and (iii). According to the flowchart of FIG. 30, when the identifying codes are identical in the step S22, a signal allowing start-up is sent to ECU 2 in a step S126, and the aforesaid injection pulse width Tst is calculated in a step S127. Also, in the routine of FIG. 31, after first verifying that the ignition switch is ON in a step S131, communication between ECU 2 and IMMU 11 begins in a step S132.

Further, according to the sixth embodiment, the routine of FIG. 19 is executed when the reset signal is ON. According to this embodiment, however, when the ignition switch is switched from OFF to ON, it is determined whether or not ECU 2 has a fault in the step S141, and the processing of the steps S91–S93 is performed only when it has a fault. When ECU 2 does not have a fault, the program proceeds to the routine shown in FIG. 2.

According to this embodiment also, moreover, if ECU 2 is damaged before engine start-up, and the ignition switch is then moved to the START position, back-up by the gate array 22 is not performed. This is the same as in the sixth embodiment.

However, if a fault occurs in ECU 2 after engine start-up while the vehicle is running, the assumption that the ignition switch has been switched from OFF to ON does not hold, hence according to this embodiment, the routine of FIG. 29 is not performed. Back-up by the gate array 22 therefore is not performed, and the engine stalls.

The power supply hybrid IC 21 and gate array 22 used in the sixth to eleventh embodiments may of course be replaced by the ECU 61 shown in FIG. 16.

The embodiments of this invention in which an exclusive property or privilege is claimed are defined as follows:

We claim:

1. An anti-theft device for an engine-driven vehicle comprising:
   a control unit for controlling at least one of either a supply of fuel to said engine or an ignition timing of said fuel,
   back-up means acting for said control unit when said control unit is damaged,
   means for determining whether or not said control unit has functioned appropriately when said engine is started up, and
   means for prohibiting the function of said back-up means when said control unit has not functioned appropriately when said engine is started up.

2. An anti-theft device for an engine-driven vehicle comprising:
   a control unit for controlling at least one of either a supply of fuel to said engine or an ignition timing of said fuel,
   back-up means acting for said control unit when said control unit is damaged,
   first means for storing an identifying code provided inside said control unit,
   second means for storing an identifying code, said second means provided outside said control unit,
   means for verifying whether or not said identifying codes stored in said first and second storing means are identical when said engine is started up,
   means for preventing engine start-up when said identifying codes are not identical,
   means for retaining a verification result of whether or not said identifying codes are identical, and
   means for prohibiting a function of said back-up means when said verification result shows said identifying codes are not identical.

3. An anti-theft device as defined in claim 2, wherein said retaining means comprises means for coding said verification result, means for decoding said code, and means for retaining said decoded result.

4. An anti-theft device as defined in claim 3, wherein said code decoding means, said decoded result retaining means and said prohibiting means are formed in a one-piece construction with said back-up means.

5. An anti-theft device as defined in claim 2, wherein said retaining means retains a verification result also after said engine stops.

6. An anti-theft device for an engine-driven vehicle comprising:
   a starter means for starting said engine,
   a control unit for controlling at least one of either a supply of fuel to said engine or an ignition timing of said fuel,
   back-up means acting for said control unit when said control unit is damaged,
   means for detecting a rotation of said engine,
   means for detecting whether or not said starter means is operating,
   means for prohibiting a function of said back-up means when said rotation is not detected, and
   means for prohibiting the function of said backup means while said starter means is operating.

7. An anti-theft device for an engine-driven vehicle comprising:
   a starter means for starting said engine,
   a control unit for controlling at least one of either a supply of fuel to said engine or an ignition timing of said fuel by outputting a control signal,
   means for outputting a rotation signal corresponding to a predetermined rotation angle of said engine,
   back-up means for outputting a control signal based on said rotation signal when said control unit is damaged for controlling at least one of either a supply of fuel to said engine or an ignition timing of said fuel,
   first means for storing an identifying code provided inside said control unit,
   second means for storing an identifying code, said second means provided outside said control unit,
   means for verifying whether or not said identifying codes stored in said first and second storing means are identical when said engine is started up,
   means for preventing engine start-up when said identifying codes are not identical,
   means for detecting whether or not said starter means is operating,
   means for prohibiting a function of said back-up means when said rotation signal is not detected, and
   means for prohibiting the function of said back-up means while said starter means is operating.

8. An anti-theft device as defined in claim 7, wherein said starter means operation detecting means comprises a starter switch for continuously outputting an ON signal while said starter means is operating, said two prohibiting means comprise a NOT circuit for inverting the output signal from said starter switch and an AND circuit for outputting a signal corresponding to an overlapping part of said inverted signal and said rotation signal, and said back-up means functions according to the output signal from said AND circuit.

9. An anti-theft device as defined in claim 7, wherein said starter means operation detecting means comprises a starter switch for continuously outputting an ON signal while said starter means is operating, said two prohibiting means comprise a NOT circuit for inverting the output signal from said starter switch, and an AND circuit for outputting a signal corresponding to an overlapping part of the signal output by said back-up means and the signal output by said NOT circuit as said control signal.

10. An anti-theft device for an engine-driven vehicle comprising:
   a starter means for starting said engine,
   means for supplying fuel to said engine according to an input injection signal,
   means for igniting said fuel inside said engine according to an input ignition signal,
   a control unit for controlling at least one of either said fuel supplying means or igniting means by outputting a control signal,
   means for outputting a rotation signal corresponding to a predetermined rotation angle of said engine,
   back-up means for outputting a control signal based on said rotation signal when said control unit is damaged for controlling at least one of either said fuel supplying means or igniting means,
   first means for storing an identifying code provided inside said control unit,
   second means for storing an identifying code, said second means provided outside said control unit,
   means for verifying whether or not said identifying codes stored in said first and second storing means are identical when said engine is started up, means for preventing engine start-up when said identifying codes are not identical, means for detecting whether or not said starter means is operating, means for prohibiting a function of said back-up means when said rotation signal is not detected, and means for prohibiting the function of said back-up means while said starter means is operating.

11. An anti-theft device for an engine-driven vehicle comprising:

a starter means for starting said engine, a control unit for controlling at least one of either a supply of fuel to said engine or an ignition timing of said fuel by outputting a control signal, an ignition switch for activating said control unit when said switch is changed over from OFF to ON, means for outputting a rotation signal corresponding to a predetermined rotation angle of said engine, back-up means for outputting a control signal based on said rotation signal when said control unit is damaged for controlling at least one of either a supply of fuel to said engine or an ignition timing of said fuel, means for detecting whether or not said ignition switch has been changed over from OFF to ON, means for prohibiting engine start-up when said ignition switch has been change over from OFF to ON, first means for storing an identifying code provided inside said control unit, second means for storing an identifying code, said second means provided outside said control unit, means for verifying whether or not said identifying codes stored in said first and second storing means are identical when said ignition switch is changed over from OFF to ON, means for releasing prohibition of engine start-up by said prohibiting means when said identifying codes are identical, means for detecting whether or not said starter means is operating, means for prohibiting a function of said back-up means when said rotation signal is not detected, and means for prohibiting the function if said back-up means while said starter means is operating.

* * * * *